(12) United States Patent
Sekine et al.

(10) Patent No.: US 6,565,211 B1
(45) Date of Patent: May 20, 2003

(54) PROJECTION TYPE DISPLAY DEVICE

(75) Inventors: Atsushi Sekine, Kasukabe (JP); Yuji Manabe, Kamakura (JP); Tetsuo Hattori, Yokohama (JP)

(73) Assignee: Nikon Corporation, Tokyo (JP)

( * ) Notice: Subject to any disclaimer, the term of this patent is extended or adjusted under 35 U.S.C. 154(b) by 10 days.

(21) Appl. No.: 09/692,413

(22) Filed: Oct. 20, 2000

(30) Foreign Application Priority Data

Oct. 22, 1999 (JP) ............................................ 11-301304

(51) Int. Cl.[7] .................... G03B 21/14; G03B 21/00; G03B 21/26; G03B 21/28; G02F 1/1335
(52) U.S. Cl. ........................... 353/20; 353/31; 353/33; 353/34; 353/37; 353/38; 353/97; 349/7; 349/9
(58) Field of Search ............................ 353/20, 31, 33, 353/34, 37, 97, 38; 349/5, 7, 9

(56) References Cited

U.S. PATENT DOCUMENTS

| | | | |
|---|---|---|---|
| 5,438,379 A | | 8/1995 | Kurematsu ................... 353/98 |
| 5,541,679 A | * | 7/1996 | Yang ........................... 353/98 |
| 5,634,704 A | | 6/1997 | Shikama et al. .............. 353/31 |
| 5,786,934 A | * | 7/1998 | Chiu et al. ................... 359/494 |
| 5,800,033 A | | 9/1998 | Funanami et al. ............ 353/97 |
| 6,028,703 A | | 2/2000 | Sekine et al. ................. 359/487 |
| 6,062,694 A | * | 5/2000 | Oikawa et al. ............... 353/31 |
| 6,262,851 B1 | * | 7/2001 | Marshall ...................... 359/634 |
| 6,331,060 B1 | * | 12/2001 | Yamamoto et al. .......... 353/31 |
| 6,340,230 B1 | * | 1/2002 | Bryars et al. ................. 353/31 |
| 6,429,906 B1 | | 8/2002 | Sekine et al. ................. 349/9 |

* cited by examiner

Primary Examiner—Russell Adams
Assistant Examiner—Magda Cruz

(57) ABSTRACT

A projection type display device, having a light beam flux converting optical system which makes plural beam fluxes from light emitted from a light source and converts the each beam flux into a parallel beam flux and makes the each beam flux advance in a different direction, a polarized light separating color separating optical system which polarization separates and color separates light which was emitted from the light beam flux converting optical system, plural reflecting type light valves which modulate polarized light components emitted from the polarized light separating color separating optical system based on image information and a color synthesizing and analyzing optical system performing color synthesis and analysis of modulated light which were emitted from the plural reflecting type light valves.

42 Claims, 10 Drawing Sheets

PROJECTION TYPE DISPLAY DEVICE

CROSS-REFERENCE TO RELATED APPLICATIONS

This application claims the benefit of Japanese Patent Application No. 11-301304 filed Oct. 22, 1999, the disclosure of which is incorporated herein by reference.

DETAILED DESCRIPTION OF THE INVENTION

1. Field of the Invention

The present invention relates to a projection type display device, which, modulating light incident on light valves, projects the light.

2. Description of the Related Art

The full color type of projection type display device of Japanese Patent Application No. 2505758 is known as an example of a prior art projection type display device.

Moreover, it is known to use a fly's eye integrator as an illuminating device of a light valve of a projection type display device. Nevertheless, when a fly's eye integrator was simply applied to a projection type display device, uniform illumination of the light valves was attained, but there were problems of reduced contrast and non-uniformity in the projected image. Moreover, there were problems of low degree of design freedom from the large size of the device.

SUMMARY OF THE INVENTION

The present invention has as its object to provide a projection type display device having increased contrast and reduced non-uniformity of the projected image in comparison with the prior art devices. Moreover a particular object of the present invention is to provide a small sized device having a high degree of design freedom in comparison with the prior art devices.

In order to solve the above problems, the first exemplary projection type display device has a secondary light source image forming optical system 202, 203 that forms plural secondary light source images from light emitted from a light source, and a polarized light separating optical system 206 which polarization separates a first polarized light component of light emitted from said plural secondary light source images, and a color separating optical system 207A, 207B, 207C which separates into plural colors, the first polarized light component emitted from said polarized light separating system 206 and emits these, and, respectively arranged for each color light emitted from said color separating optical system 207A, 207B, 207C, plural reflecting type light valves 208 which modulate, based on image information, the first polarized light component to a second polarized light component, and a color synthesizing optical system 207A, 207B, 207C which color synthesizes and emits modulated lights respectively emitted from the plural reflecting type light valves 208, and an analyzing optical system 206 which analyzes said second polarized light component from light emitted from the color synthesizing optical system 207A, 207B, 207C, and a condenser lens 204 which causes the condensing of light beam fluxes emitted from the plural secondary light source images, and also causes the superposition, on the whole surface of respective plural reflection type light valves 208, of the light beam fluxes respectively emitted from said plural secondary light source images, and, arranged between said plural secondary light source images and said plural reflecting type light valves 208, a field lens 205 which converts into a parallel light beam flux the light beam flux emitted from the predetermined point of said plural secondary light source images: the polarized light separating optical system 206, and the plural reflecting type light valves 208, and the analyzing optical system 206, are arranged in the parallel light beam flux converted by means of the field lens 205.

Another projection type display device is the first exemplary projection type display device noted above, having a projection type optical system 209a, 209b which projects images of the plural reflection type light valves 208, and an aperture stop 209c which sets the numerical aperture of the reflected light emitted from the plural light valves 208; by means of the lens 209a toward the plural reflecting type light valves 208 within the projection optical system 209a, 209b, arid of the field lens 205, the predetermined point and the central portion of the aperture stop 209c are in a conjugate relationship.

Another projection type display device is the first exemplary projection type optical system noted above, having a projection optical system 209a, 209b which projects images of the plural reflecting type light valves 208, and an aperture step 209c which sets the numerical aperture of the reflected light emitted from said plural light valves 208; the principal rays defined by the aperture stop 209c are parallel with respect to the optical axis extending at right angles to the center of the plural reflecting type light valves 208, in a position in which the light beam flux emitted from the predetermined point of the plural secondary light source images becomes a parallel light beam flux by means of the field lens 205.

Another projection type display device is the first exemplary projection type display device noted above where the plural reflecting type light valves 208 are arranged in a position of optical path length of air equivalent length about (f1(f2−f1))/f2 from the a field lens 205 (where f1 is the focal length of the field lens, f2 is the local length of the condenser lens).

Another projection type display device is the first exemplary projection type optical system noted above, where the secondary light source forming optical system includes a fly's eye integrator 202, 203. Another projection type display device is the first exemplary projection type display device noted above, where the fly's eye integrator 202, 203' comprises a first lens plate 202 with plural first lens components 202a in a planar configuration, and a second lens plate 203', having plural second lens components 203'a respectively arranged in focal positions of said plural first lens components 202a disposed corresponding to the first lens plate 202, the plural second light source images being formed by the plural second lens components 203'a; the second lens plate 203' conjointly has the function of the condenser lens.

Another projection type display device is the first exemplary projection type display device noted above, where the secondary light source forming optical system includes a rod integrator 520 and a relay lens 521. Another projection type display device is the first exemplary projection type display device noted above, where the function of the field lens and the function of the condenser lens are combined by means of one conjointly used optical system 104.

A second exemplary projection type display device has a secondary light source forming optical system 102, 103 which forms plural secondary light source images on a predetermined surface from light emitted from a light source, and light valves 108 which modulate, based on image information, and emit light emitted from said plural secondary light source images, and a conjoint use optical system 104 combining the function of a condenser lens which is arranged between the plural secondary light source images and the light valves 108, which causes condensation of the light beam fluxes emitted from the plural secondary light source images, and which causes superposition in the light valves 108 whole surface of light beam fluxes emitted from the plural secondary light source images, and the function of the field lenses which convert to a parallel light beam flux, the light beam flux emitted from the predetermined point of the plural secondary light source images.

Another projection type display device is the second exemplary projection type display device noted above, where a projection optical system 109a, 109B which projects an image of the light valves 108, and an aperture stop 109C which sets the numerical aperture of light emitted from the light valves 108; by means of the lens on the light valve 108 side within the projection optical system 109a, 109b, and the conjoint use optical system 104, the predetermined point and the center portion of the aperture stop 109c become in a conjugate relationship.

Another projection type display device is the second exemplary projection type display device noted above, where a projection optical system 109a, 109b which projects an image of the light valves 108, and an aperture stop 109c which sets the numerical aperture of light emitted from the light valves 108; the principal rays defined by the aperture stop 109c are parallel with respect to the optical axis extending at right angles to the center of the light valves 108, in a position in which the light beam flux emitted from the predetermined point of said plural secondary light source images becomes a parallel light beam flux by means of the conjugate optical system 104.

Another projection type display device is the second exemplary projection type display device noted above, where the light valves 108 each correspond to one respective color, and are plural reflecting type light valves 108 which modulate, based don image information, the first polarized light components to second polarized light component and furthermore has a polarized light separating optical system 106 which polarization separates said first polarized light component from light emitted from the secondary light source forming optical system 102, 103, and a color separating optical system 107A, 107B, 107C, separating into plural colors the first polarized light component emitted from the polarized light separating system 106, and respectively emitting to said plural reflecting type light valves 108, and a color synthesizing optical system 107A, 107B, 107C, color synthesizing modulated light respectively emitted from said plural reflecting type light valves 108, and an analyzing optical system 106 which analyzes the second polarized light component from light emitted from the color synthesizing optical system 107A, 107B, 107C.

Another projection type display device is the second exemplary projection type display device noted above, where the secondary light source formation optical system includes a fly's eye integrator 102, 103. Another projection type display device is the second exemplary projection type display device noted above, where the secondary light source image forming optical system includes a rod integrator 520 and a relay lens 521.

A third exemplary projection type display device has a secondary light source image forming optical system 302, 303 which forms on a predetermined surface, plural secondary light source images from light emitted from a light source, and a polarized light separating optical system 310 which polarization separates light emitted from said plural secondary light source images, and a first color separating optical system 311A, 306 which, separating light emitted from the polarized light separating system 310 into first color light and mixed light of second arid third colors, emits these, and a second color separating optical system 311B, 313 which, separating from said mixed light of second and third colors, second color light and third color light, emits these, and a first reflecting type light valve 308R which modulates, according to image information, said first color light emitted from said first color separating optical system 311A, 306, a second reflecting type light valve 308R which modulates, according to image information, said second color light emitted from said second color separating optical system 311B, 313, and a third reflecting type light valve 308B which modulates, according to image information, said second color light emitted from said second color separating optical system 311B, 313, and an analyzing optical system 312, analyzing and emitting light emitted from said first reflecting type light valve 308G, and a first color synthesizing optical system 313, analyzing, color synthesizing and emitting light emitted from the second reflecting type light valve 308R and the third reflecting type light valve 308B, and a second color synthesizing optical system 311C, 314, 315, color synthesizing and emitting light emitted from the first color synthesizing optical system 313 and the analyzing optical system 312; said second color separating optical system 313B, 313 includes a wavelength dependent polarization converting device 311B which converts only one of said second color light and third color light, and a polarizing beam splitter 313, polarized light separating light emitted from said wavelength dependent polarization converting device 311B; the first color synthesizing optical system 313 includes the polarizing beam splitter 313 conjointly used with the second color separating optical system 313B; furthermore having a condenser lens 304 causing condensing of the light beam fluxes emitted from the plural secondary light source images, and also causing superposition, in the respective whole plane of the first through third light valves 308, of light beam fluxes emitted from the plural secondary light source images, and, arranged between the plural secondary light source images and the first through third reflecting type light valves 308, a field lens 305 which converts to a parallel light beam flux the light beam flux emitted from the predetermined point of the plural secondary light source images; the analyzing optical system 312, and the first through third reflecting type light valves 308, and the first color synthesizing optical system 313, and the second color synthesizing optical system 311C, 314, 315, are arranged in said parallel light beam flux converted by means of the field lens 305.

Another projection type display device is the third exemplary projection type display device noted above, where a projection optical system 309a, 309b projecting images of the first through third reflecting type light valves 308, and an aperture stop 309c which sets the numerical aperture of the reflected light emitted from the first through third light valves 308, by means of the lens 309a toward the first through third reflecting type light valves 308 among said projection optical systems 309a, 309b, and of the field lens 305, a conjugate relationship exists between said predetermined point and the central portion of said aperture stop 309a.

Another projection type display device is the third exemplary projection type display device noted above, where a projection optical system 3109a, 309h which projects images of the first through third reflecting type light valves 308, and an aperture stop 309c which sets the numerical aperture emitted from the first through third reflecting type light valves 308; the principal ray defined by said aperture stop 309c is parallel with respect to the optical axis extending at right angles to the center of the first through third reflecting type light valves 308, in a position in which the light beam flux emitted from the predetermined point of said plural secondary light source images become a parallel light beam flux by means of said field lens 305.

Another projection type display device is the third exemplary projection type display device of claim 15; the first through third reflecting type light valves 308 are arranged in a position of optical path length of air equivalent length about (f1(f2−f1))/f2 from the field lenses (where f1 is the focal length of the field lens 305, f2 is the focal length of the condenser lens).

Another projection type display device is the third exemplary projection type display device noted above, where the secondary light source forming optical system includes a fly's eye integrator 302, 303. Another projection type display device is the third exemplary projection type display device noted above, where the secondary light source forming optical system includes a rod integrator 520 and a relay lens 521. Another projection type display device is the third exemplary projection type display device noted above, where the function of the field lens and the function of the condenser lenses are combined by means of one conjointly used optical system 404.

A fourth exemplary projection type display device is a projection type display device having a secondary light source image forming optical system 302, 303 which forms can a predetermined surface, plural secondary light source images from light emitted from a light source, and a polarized light separating optical system 310 which separates polarized light emitted from the plural secondary light source images, and a first color separating optical system 311A, 306 which separates light emitted from the polarized light separating optical system 310 into first color light and mixed light of second and third colors, and emits these, and a second color separating optical system 311B, 313 which separates, from said mixed light of second and third colors, second color light and third color light, and emits these, and a first reflecting type light valve 3086 which modulates, according to image information, said first color light emitted from said first color separating optical system 311A, 306, and a second reflecting type light valve 308R which modulates, according to image information, said second color light emitted from said second color separating optical system 311B, 313, and a third reflecting type light valve 308G which modulates, according to image information, said second color light emitted from said second color separating optical system 311B, 313, and an analyzing optical system 312, analyzing and emitting light emitted from said first reflecting type light valve 308G, and a first color synthesizing optical system, analyzing, color synthesizing arid emitting light emitted from said second reflecting type light valve 308R and said third reflecting type light valve 308B, and a second color synthesizing optical system 311C, 314, 315, color synthesizing and emitting light emitted from said first color synthesizing optical system 313 and said analyzing optical system 312; said second color separating optical system 311B, 313 includes a wavelength dependent polarization converting device 311B which converts only one of said second color light and third color light, and a polarizing bean splitter 313, polarization separating light emitted from said wavelength dependent polarization converting device 311B, said first color synthesizing optical system 313 includes said polarizing beam splitter 313 conjointly used with said second color separating optical system 311B, furthermore having a condensing lens 304 causing condensing of the light beam fluxes emitted from the plural secondary light source images, and also causing superposition, in the respective whole plane of the first through third light valves 308, of light beam fluxes emitted from the plural secondary light source images, and, arranged between the plural secondary light source images and the first through third reflecting type light valves 308, a field lens 305 which converts to a parallel light beam flux the light beam flux emitted from the predetermined point of the plural secondary light source images; said wavelength dependent polarized light conversion dc-vice 311B is arranged in said parallel light beam fluxes converted by means of said field lens 305.

Another projection type display device is the fourth exemplary projection type display noted above, where a projection optical system 309a, 309b projecting images of the first through third reflecting type light valves 308, and an aperture stop 309c which sets the numerical aperture of the reflected tight emitted from the first through third reflecting type light valves 308, by means of the lens 309a toward the first through third reflecting type light valves 308 among the projection optical system 309a, 309b, and of the field lens 305, a conjugate relationship exists between said predetermined point and the central portion of said aperture stop 309c.

Another projection type display device is the fourth exemplary projection type display device noted above, where a projection optical system 309a, 309b which projects images of the first through third reflecting type light valves 308, and an aperture stop 309c which sets the numerical aperture emitted from the first through third reflecting type light valves 308; the principal rays defined by said aperture stop 309c are parallel with respect to the optical axis extending at right angles to the center of the first through third reflecting type light valves 308, in a position in which the light beam flux emitted from the predetermined point of said plural secondary light source images becomes a parallel light bean flux by means of said field lens 305.

Another projection type display device is the fourth exemplary projection type display device noted above, where said secondary light source forming optical system includes a fly's eye integrator 302, 303. Another projection type display device is the fourth exemplary projection type display device noted above, where said secondary light source forming optical system includes a cod integrator 520 and a relay lens 521. Another protection type display device is the fourth exemplary projection type display device noted above, where the function of the field lens and the function of the condenser lens are combined by means of one conjointly used optical system 404.

A fifth exemplary projection type display device is a projection type display device, leaving a secondary light source image forming optical system 402, 403 which forms on a predetermined surface, plural secondary light source images from light emitted from a light source, and a polarized light separating optical system 410 which polarization separates light emitted from said plural secondary light source images, and a first color separating optical system 411A, 406 which separates light emitted from the polarized light separating optical system 410 into first color light and mixed light of second and third colors, and emits these, and a second color separating optical system 411B, 413 which separates, from said mixed light of second and third colors, second color light and third color light, and emits these, and a first reflecting type light valve 408G which modulates, based on image information, said first color light emitted from said first color separating optical system 411A, 406, and a second reflecting type light valve 408R which modulates, based on image information, said second color light emitted from said second color separating optical system 411B, 413, anti a third reflecting type light valve 408B which modulates, based on image information, the third color light emitted from said second color separating optical system 411B, 413, and an analyzing optical system 412, analyzing and emitting light emitted from said first reflecting type light valve 408G, and a first color synthesizing optical system 413, analyzing, color synthesizing and emitting light emitted from said second reflecting type light valve 408R and said third reflecting type light valve 408R, and a second color synthesizing optical system 411C, 414, 415, color synthesizing and emitting light emitted from the first color synthesizing optical system 413 and the analyzing optical system 412; the second color separating optical system 411C, 414, 415 includes a wavelength dependent polarization converting device 411B which converts only one of the second color light and third color light, and a polarizing beam splitter 413, polarized light separating light emitted from the wavelength dependent polarization converting device 411B, the first color synthesizing optical system 413 includes the polarizing beam splitter 413 conjointly used with the second color separating optical system 411B, 413; furthermore having, arranged between the plural secondary light source images and the first through third reflecting type light valves 408, a conjointly used optical system 404 having the function of a condenser lens causing the condensing of light beam fluxes emitted from said plural secondary light source images, and also causing the superposition, in the respective whole plane of the first through third light valves 408, of light beam fluxes emitted respectively from said plural secondary light source images, and the function of a field lens converting the light beam flux emitted from the predetermined point of said plural secondary light source images to a parallel light beam flux.

Another projection type display device is the fifth exemplary projection type optical system noted above, where a projection optical system 409a, 409b projecting images of the first through third reflecting type light valves 408, and an aperture stop 409c which sets the numerical aperture of the reflected light emitted from the first through third reflecting type light valves 408; by means of the lens toward the first through third reflecting type light valves 408 among the projection optical system 409a, 409b and the conjoint use optical system 404, a conjugate relationship is established between said predetermined point and the central portion of said aperture stop 409c.

Another projection type display device is the fifth exemplary projection type display device noted above, where a projection optical system 409a, 409b which projects images of the first through third reflecting type light valves 408, and an aperture stop 409c which sets the numerical aperture emitted from the first through third reflecting type light valves 408; the principal rays defined by the aperture stop 409c are parallel with respect to the optical axis extending at right angles to the center of the first through third reflecting type light valves 408, in a position in which the light beam flux emitted from the predetermined point of said plural secondary light source images becomes a parallel light beam flux by means of said conjointly used optical system 404.

Another projection type display device is the fifth exemplary projection type display device noted above, where the secondary light source forming optical system includes a fly's eye integrator 402, 403. Another projection type display device is the fifth exemplary projection type display device noted above, where the secondary light source forming optical system includes a rod integrator 520 and a relay lens 521.

A sixth exemplary projection type display device is a projection type display device, having a parallel light beam flux converting optical system 202, 203, 204, 205 which converts to one parallel light beam flux, at least one portion of the light which the light source emits, and a polarized light separation and color separating optical system 206, 207A, 207B, 207C which emits, performing polarization separation and color separation, light which was emitted from said parallel light beam flux converting optical system 202, 203, 204, 205, and plural reflecting type light valves 208 which modulate a polarized light component based oil image information, arranged in each respective light beam flux emitted from the polarized light separation and color separating optical system 206, 207A, 207B, 207C, and color synthesizing and analyzing optical system 206, 207A, 207B, 207C which color synthesizes and analyzes modulated light which was respectively emitted from the plural reflecting type light valves 208; said polarized light: separation color separating optical system 206, 207A, 207B, 207C, the plural reflecting type light valves 208, and the color synthesizing and analyzing optical system 206, 207A, 207B, 207C, are arranged in the parallel light beam flux converted by means of the parallel light beam flux converting optical system 202, 203, 204, 205.

Another projection type display device is the sixth exemplary projection type display device noted above, where said parallel light beam flux converting system 202, 203, 204, 205 includes a secondary light source image forming optical system 202, 203 which forms, on a predetermined surface, plural secondary light source images from light emitted from the light source, and, arranged between said plural secondary light source images and said plural reflecting type light valves 208, one field lens 205 which converts to a parallel light beam flux, the light beam flux emitted from the predetermined point of the plural secondary light source images.

DETAILED DESCRIPTION OF THE PREFERRED EMBODIMENTS

Figure 1:
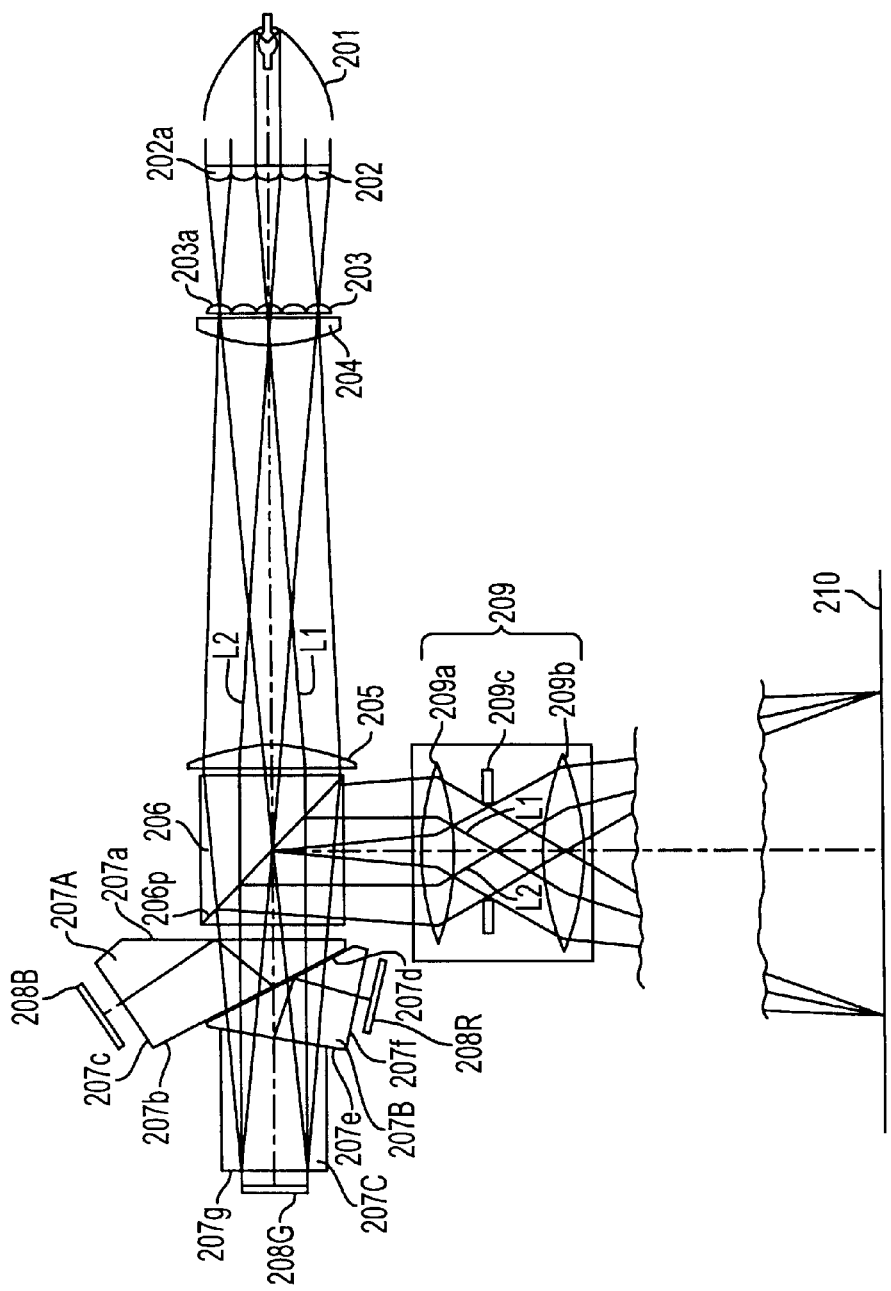
FIG. 1 is a constitution and light ray diagram of the projection type display device of the first embodiment.
Figure 2:
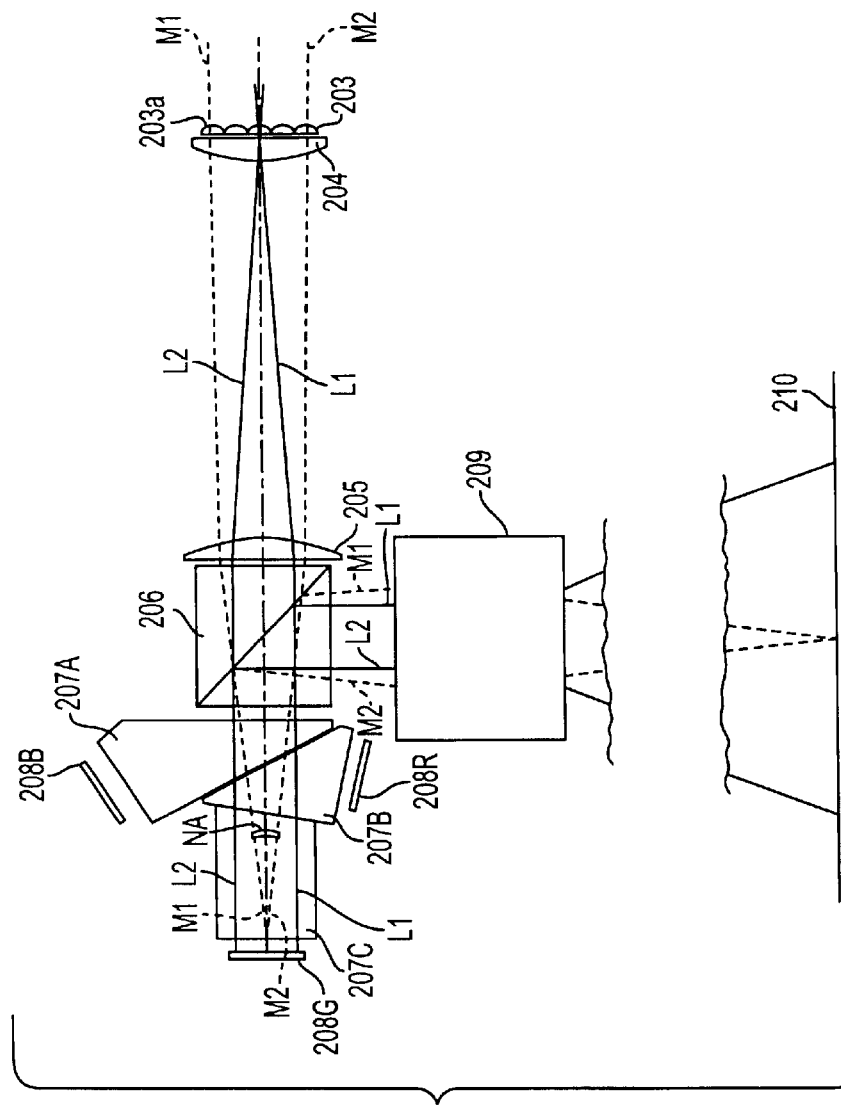
FIG. 2 is a light ray diagram illustrating the principal rays and numerical aperture in the projection type display device of the first embodiment.

FIGS. 1 and 2 show a basic configuration view of the projection type display device showing a first mode of embodiment of the present invention, and also light ray diagrams in said device. Firstly, the projection type display device will be described from the basic configuration.

The optical axis of the projection type display device is an axis defined as extending at right angles to the center of the reflecting type light valves, 208G. Furthermore, in a case in which the optical axis is bent by means of mirrors or the like optical members, this bent axis is also defined as an optical axis. Hereinafter, except where specifically excluded, "optical axis" is taken to be the optical axis of the system.

To begin with, the illuminating optical system is described. In the present embodiment, a so-called fly's eye integrator is adopted as the integrator. The illuminating optical system is constituted from a light source, 201, a fly's eye integrator 202, 203, a condenser lens 204, and a field lens 205.

The light source 201 can be made of a lamp and a concave mirror. The concave mirror is a parabolic mirror. By the use of a parabolic mirror, the emitted light is an about parallel light beam flux. Other concave mirrors may of course form c in about parallel light beam flux, for example, an elliptical mirror and a shaping lens.

The about parallel light beam flux source light from the light source 201 is incident fly's eye integrator 202, 203. The fly's eye integrator 202, 203 is constituted from a first lens plate 202 and a second lens plate 203. Plural lenses 202a are arrayed in a planar manner on the first tens slate 202. Plural lenses 203a are arrayed in a planar manner on the second lens plate 203. The lenses 203a of the second lens plate 203 are respectively arranged corresponding to focal positions of the lenses 202a of the first lens plate 202.

In the above-mentioned constitution, the about parallel light beam flux emitted from the concave mirror is divided by means of the apertures of the plural lenses 202a of the first lens plate 202. Then, as shown in FIG. 1, light emitted from the plural lenses 202a of the first lens plate 202 is condensed to the respectively corresponding plural lenses 203a of the second lens plate 203. Namely, secondary light source images are respectively formed at the plural lenses 203a of the second lens plate 203.

The condenser lens 204 is arranged close to the exit surface of the second lens plate 203. As shown in FIG. 2, the condenser lens 204 has the function of causing the condensing of the illuminating light beam flux emitted from the secondary light source images of the second lens plate 203. Moreover, the condenser lens 204 has the function of causing the superposition of the light beam fluxes emitted from the respective secondary light source images, formed by means of the fly's eye integrator 202, 203, in the whole surface of the reflecting type light valves 208 which are the members to be illuminated.

The conjugate relationship of the first lens plate 202a and the reflecting type light valves 208R, 208G, 208B is effected by means of the lenses 203a of the second lens plate 203, the condenser lens 204, and the field lens 205. The light incident on the plural lenses 203a of the second lens plate 203 is therefore superposed on, and illuminates, the reflecting type light valves 208. Accordingly, the reflecting type light valves 208R, 208G 208B are uniformly illuminated.

As shown in FIGS. 1 and 2, the field lens 205 converts to parallel light beam fluxes the light beam fluxes (L1, L2, etc.) emitted from each secondary light source image formed by the plural lenses 203a of the second lens plate 203. The center lens among the plural lenses 203a of the second lens plate 203 is arranged in a position conjugate to the center portion of the aperture stop 209c in the projection lens 209 mentioned hereinafter. This conjugate relationship is effected by means of the condenser lens 204, the field lens 205, and the front group lens 209a, and principally by means of the field lens 205 and the front group lens 209a.

Next, optical systems that perform polarized light separation, color separation, color synthesis, and analysis will be described. Light emitted from the field lens 205 is incident on a polarizing beam splitter 206, and is polarization separated into P polarized light, which is transmitted and advances, and S polarized light, which is reflected and discarded.

The P polarized light transmitted by the polarizing beam splitter 206 is incident on a surface 207a of a prism 207A of a combined color separation and synthesis prism. The combined color separation and synthesis prism is constituted from a prism 207A, a prism 207B, and a prism 207C. Furthermore, the prism 207A and the prism 207B are arranged with an air gap between them. The prism 207B and the prism 207C are made integral by joining with adhesive the prism 207C and a R light reflecting dichroic film formed on the surface 207e of the prism 207.

Light incident on the prism 207A, advancing unchanged, is color separated by means of a B light reflecting dichroic film formed on the surface 207b into B light and mixed light consisting of R and G light. The B light reflecting dichroic film has the property of reflecting B light and transmitting R light and G light. The B light reflected by the surface 207b advances, undergoes total reflection at the surface 207a, and is emitted from the surface 207c of the prism 207A. The light 13 is then incident on the reflecting type light valve 208B arranged in the neighborhood of the exit surface 207c.

The mixed R and G light emitted from the prism 207A is incident on the prism 20713. The mixed R and G light travels within the prism 207B and is color separated into R light and G light by means of an R light reflecting dichroic film formed on the surface 207e. The R light reflecting dichroic film has the property of reflecting R light and transmitting G light.

After this, the R light travels within the prism 207B, undergoes total reflection at the surface 207d, and is emitted from the surface 207f. The R light is then incident on the reflecting type light valve 2088 arranged in the neighborhood of the exit surface 207f.

The G light emitted from the prism 207B is incident on the prism 207C. The G light then; travels through the prism 207C and is emitted from the surface 207g. The G light is then incident on the reflecting type light valve 208G arranged in the neighborhood of the exit surface 207g.

The function of the reflecting type light valves 208R, 208G, 208B will be described here. These reflecting type light valves 208 are electrical writing type reflecting type light valves. Electrical writing type reflecting type light valves leave the function of being able to confer the function as a wavelength plate layer on a specific place:of a liquid crystal layer. Namely, a reflecting type light vale 208, with respect to incident linearly polarized light (for example, P polarized light), causes reflection and emission, polarization converting, according to the gradation level, the direction of oscillation of the polarized light at a concerned place selected according to the picture signal of each color. For example, the reflecting type light valve 208 causes reflection and emission with unchanged polarization (P polarized light) of incident light of a non-selected place, the gradation level of which is minimum. Moreover, the reflecting type light valve 208 causes a rotation through 90 degrees of the direction of oscillation of the polarized light (converting it to S polarized light), for light incident on a selected place where the gradation level is a maximum. Then, for light incident on a selected place where the gradation level is intermediate, the reflecting type light valve 208 causes reflection and emission as, elliptically polarized light, with the direction of oscillation of the polarized light rotated according) to the gradation level.

Light emitted from the reflecting type light valve 208 travels in a reverse direction to the direction of incidence, and on the same optical axis as the incidence optical axis, attaining color synthesis by means of traveling in a direction which is the reverse of the direction of incidence. Then, the color synthesized light is emitted from the surface 207*a* of the prism 207A.

In the above manner, the synthesis light emitted from the combined prism is mixed light cal modulated light (S polarized light) and unmodulated light (P polarized light). This light is incident on the polarizing beam splitter 206, and only the modulated light (S polarized light) is analyzed, as reflected light, by means of the polarized light separating member 206*p*. Furthermore, the P polarized light corresponding to the unmodulated light passing through the polarizing beam splitter 206 in the direction of the light source 201 is discarded as useless light. The analyzed light is incident on the projection lens 209 and is projected as a full color image on the screen 210.

The above is the basic constitution of the projection type display device with which the first mode of embodiment is concerned. After this, concerning the first embodiment, a description will be given of the principal ray defined by the aperture stop 209*c* of the projection lens 209. Firstly, the structure of the projection lens 209 will be described. The projection lens 209 has a front group lens 209*a*, a rear group lens 209*b*, and an aperture stop 209*c*. The front group lens 209*a* is arranged forward (toward the reflecting type light valve 208) of the aperture stop 209*c*. The rear group lens 209*b* is arranged rearward (toward the screen) of the aperture stop 209*c*.

Furthermore, the aperture stop 209*c* is arranged in the position of the focal length of the front group lens 209*a*. A so-called front side (reflecting type light valve 208 side) telecentric optical system is constituted. Here, a principal ray is defined as a ray passing through the center of the aperture stop 209*c*. The principal rays are infinite in number according to this definition, but among these, two elements (L1, L2) are illustrated as full lines in FIG. 1.

As shown in the Figure, the rays L1, L2 passing through the center of the aperture stop 209*c* of the projection lens 209 can be considered in reverse with respect to the travel direction (screen direction) of the rays (principal rays) L1, L2. As mentioned hereinabove, because a telecentric optical system is constituted by the front group lens 209*a* and the aperture stop 209*c*, it can be understood that the principal rays L1, L2 can become parallel light rays with respect to the optical axis.

Furthermore, when the light path as regards the principal rays L1, L2 is considered in reverse, in the light path between the polarizing beam splitter 206, the combined color separation and synthesis prism (prism 207A, prism 207B, prism 207C), and the reflecting type light valves 208B, 208R, 208G, the principal rays L1, L2 are kept parallel with respect to the optical axis.

Furthermore, similarly the principal rays L1, L2 are parallel to the optical axis, [through] the respective reflecting type light valves 208B, 208R, 208G, the combined color separation and synthesis prism (prisms 207A, 207B, 207C, and the polarizing beam splitter 206, extending as far as the field lens 205.

Furthermore, considering in reverse the light paths of the principal rays L1, L2 from the field lens 205, through the condenser lens 204, the principal rays L1, L2 intersect in the position of the lens 203*a* on the optical axis arranged in the approximate central portion of the second lens plate 203 constituting a fly's eye integrator.

Furthermore, considering in reverse the light paths of the principal rays L1, L2 from the second lens plate 203, the principal rays L1, L2, intersecting and broadening, intersect in edge portions of the lens 202*a* of the first lens plate 202. Furthermore, when in reverse, the principal rays L1, L2, as parallel light rays and collide with the light source 201.

From the above description, it can be understood that the telecentric relationship is maintained in the light path from the exit surface of the field lens 205 up to the entry surface of the front group lens 209*a*.

Furthermore, in FIG. 1, other than the principal rays L1, L2, rays are also shown which pass through both edge portions of the aperture stop 209*c*. As regards these rays, as can be understood from FIG. 1, there is coincidence with the light rays which travel intersecting at the center of the lenses 203*a* of both edges of the second lens plate 203.

FIG. 2 is a light ray diagram in order to illustrate the principal rays and numerical aperture in the projection type display device of the first mode of embodiment of the present invention. The light ray diagram recorded in FIG. 2 shows the above-mentioned principal rays L1, L2 and the light rays M1, M2 (shown as broken lines) which define the numerical aperture (NA).

As abovementioned, the principal rays L1, L2 are parallel to the optical axis between the respective reflecting type light valves 208G, 208R, 208B and the field lens 205, and intersect in the lens 203*a*. Accordingly, if the focal length of the field lens 205 is f1, the principal point of the second lens plate 203 is located in the approximate focal position (a distance of approximately f1 from the field lens 205) of the field lens 205. It is taken into consideration that in this location the principal rays L1, L2 pass through close to the optical axis of the condenser lens 204.

Next, a description is given regarding the light paths (M1, M2 shown by broken lines M the figure) which define the numerical aperture (NA) defined from the position of the optical axis of the reflecting type light valve 208G. The light rays M1, M2 travel having a diverging angle of a predetermined numerical aperture (NA) through the polarizing beam splitter 206, are incident on the projection lens 209 having said numerical aperture, and are condensed and imaged in the optical axis position of the screen 210.

On the other hand, a description of the light rays M1, M2 seen from the light source 201, is as follows. Namely, in terms of the result, light rays respectively traveling parallel to the optical axis through the center of the lenses 203*a* of both ends of the second lens plate 203 constituting a fly's eye integrator, come to coincide with the light rays M1, M2. Accordingly, light rays respectively traveling parallel to the optical axis [through] the center of the lenses 203*a* of both edges of the second lens plate 203, and emitted from the condenser lens 204, become condensed light rays due to the power of said lens, furthermore, through the field lens 205, traveling having said numerical aperture (NA), are condensed on the optical axis of the reflecting type light valve 208G. From this description, it is understood that the reflecting surface of the reflecting type light valve 208G is not located in the position of the focal length of the field lens 205, but is located in a position this side from the focal position.

Namely, it can be understood that the optical path length between the principal point of the field lens 205 and the principal point of the second lens plate 203 becomes longer than the optical path length between the reflecting surface of the reflecting type light valve 208 and the principal point of the field lens 205.

When the above-mentioned explanation is quantitatively stated, taking the focal length of the field lens 205 to be f1 as abovementioned, and the focal length of the condenser lens 204 to be f2(f2>f1), because the condenser lens is arranged in the neighborhood of the second lens plate 203, the distance of the principal point of the field lens 205 and the principal point of the second lens plate 203 is approximately f1. Light rays M1, M2 incident parallel to the optical axis on the second lens plate 203 from the light source side are condensed by means of the condenser lens 204 and the field lens 205 to a position on the optical axis on the reflecting type light valve 208.

The distance of the principal point of the field lens 205 and the reflecting surface of the reflecting type light valve 208 such that there is the above-mentioned relationship is easily found, from the equation of paraxial tracing due to two thin lenses, to be (air equivalent length), (f1(f2−f1))/f2. Namely, the reflecting surface of the reflecting type light valve 208 becomes located by an air equivalent length of f1(f1/f2) this side from the position of the focal length of the field lens 205. Furthermore, the air equivalent length is the optical distance, and is not the actual dimension.

By means of the above arrangement, light emitted from any of the plural secondary light source images formed at the plural lenses 203a of the second lens plate 201 illuminates, uniformly superposed, the reflecting type light valves 208.

In this manner, in the present mode of embodiment, the polarizing beam splitter 206, the respective prisms 207 constituting the color separation and synthesis prism, and the reflecting type light valves 208 used for respective colors, are arranged in positions (telecentric positions) with the principal rays L1, L2, defined by means of the aperture stop 209c of the projection lens 209, parallel to the optical axis.

By means of the above-mentioned constitution, in the light path extending from the field leafs 205 to the front group lens 209a, the light beam flux emitted from the secondary light source images formed at the lenses 203a of the second lens plate 203 becomes a parallel light beam flux. The principal rays L1, L2 of course also become parallel light beam fluxes in the light path extending from the field lens 205 to the front group lens 209a. Therefore the angle of incidence of the principal light rays with respect to the polarized light separation member 206p of the polarizing beam splitter 206, the dichroic film within the color separation synthesis prism, and the modulation layer of each reflecting type light valve, located in this optical path, respectively becomes constant.

The principal rays, in their luminosity, have the greatest effect in the projected picture. Because of this, the device of the present mode of embodiment could bring property changes to a minimum, regardless of the polarized light separating member 206p, the dichroic film in the color separation synthesis prism, and the modulation layer of the respective reflecting type light valve 208, having different properties according to the angle of incidence. Because of this, the device of present embodiment, in comparison with the prior art devices, realized a reduction of the deterioration of contrast in the projected image, and of the non-uniformity (color non-uniformity) which arose.

Moreover, by means of the above constitution, in the light path extending from the field lens 205 to the front group lens 209a, the parallel light beam flux (principal rays) emitted from the secondary light source images formed in the central lens of the plural lenses 203a of the second lens plate 203 becomes parallel with respect to the optical axis. Because of this, the image magnification of the reflecting type light valve by means of the front group lens 209a does not change. Namely, even if there is to some degree a displacement of the mounting position of the reflecting type light valve 208 in the optical axis direction, the size of the image projected onto the screen 210 does not change. Because of this, even if the respective reflecting type light valves 208 are not precisely mounted in the optical axis direction, no picture element displacement, etc., of the picture arises. Consequently, the effect is that the manufacturing cost is reduced. Furthermore, the distance of the principal point of the field lens 205 and the reflecting surface of the reflecting type light valve 208 is (f1(f2−f1))/f2 in air equivalent length. Because of this, any point on the reflecting type light valve 208 is superposed and is illuminated by the plural secondary light source images.

In the present mode of embodiment, in the fly's eye integrator 202, 203 which was used, a separated type of fly's eye integrator 202, 203 was used with the first lens plate 202 and the second lens plate 203 separated. Instead of this, there can also be used an integral type of fly's eye integrator with the function of the first lens plate 202 and second lens plate 203 combined into one. When this is so, the principal point on the exit surface side of the integral type fly's eve integrator may be arranged in the position of the approximate focal length of the field less 205. In other words, whether the fly's eye integrator is a separated type or an integral type, the principal point of the emitting surface side (second lens plate 203) of the fly's eye integrator may be arranged in the position of the approximate focal length of the field lens 205.

Figure 3:
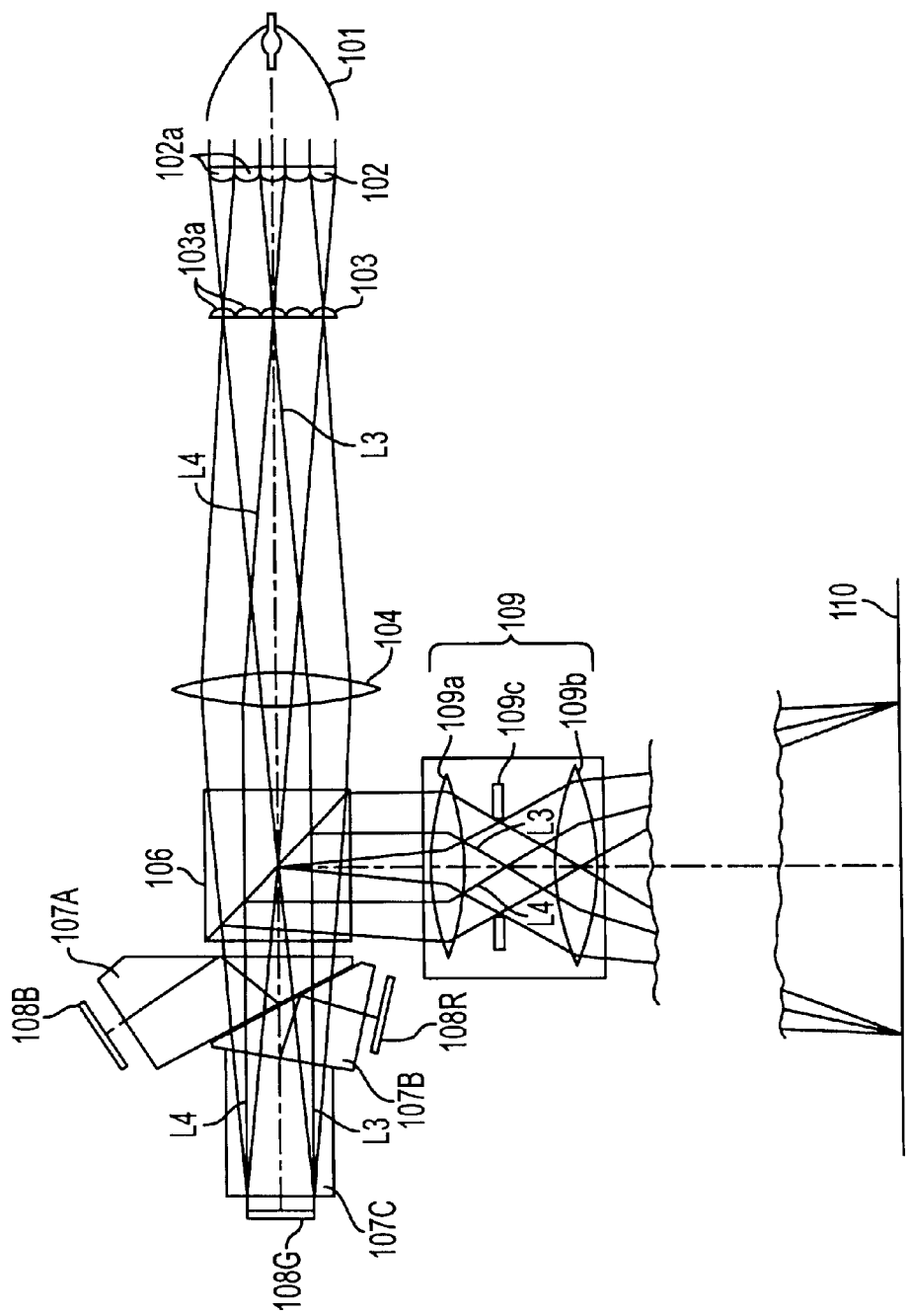
FIG. 3 is a constitution and light ray diagram of the projection type display device of the second embodiment.
Figure 4:
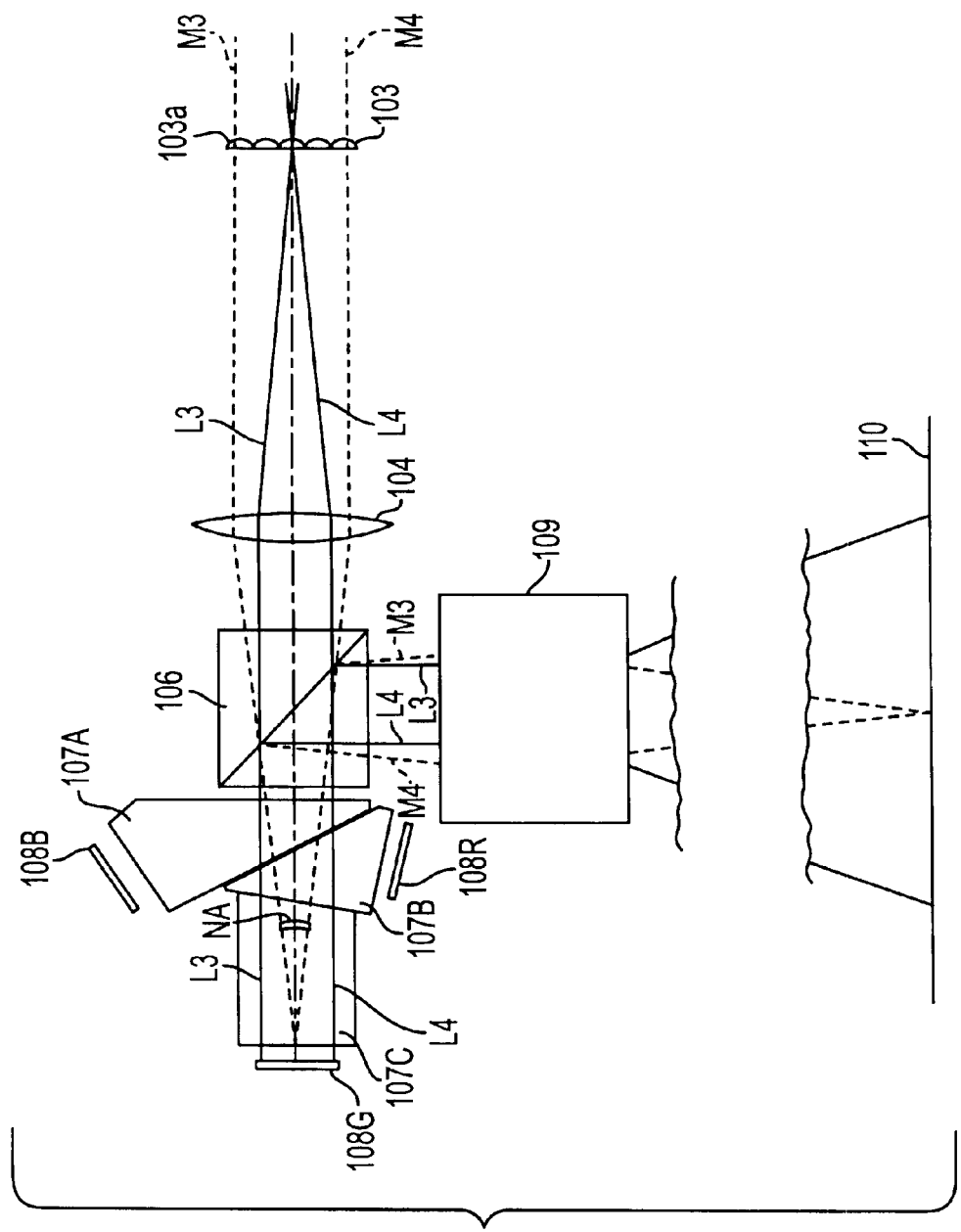
FIG. 4 is a light ray diagram illustrating the principal rays and numerical aperture In the projection type display device of the second embodiment.

FIGS. 3 and 4 show a second mode of embodiment of the present invention, the basic constitution of the projection type display device, and light ray diagrams of this device. In the device of the present embodiment, telecentricity is preserved by means of the lei-is 104 having the combined functions of a condenser lens and a field lens.

A detailed description will be omitted of the structure and function of the light source 101 first lens plate 102 consisting of plural lenses 102a, second lens plate 103 consisting of plural lenses 103a, which are similar to the light source 201, first lens plate 202, and second lens plate 203 in the first embodiment.

In the present embodiment, a condenser lens is not arranged in the neighborhood of the exit surface of the second lens plate 103. Light emitted from the second lens plate 103 is incident on the lens 104 arranged in a position neighboring tile incidence surface of the polarizing beam splitter 106. Then light emitted from the lens 104 is incident on the polarizing beam splitter 106. The polarizing beam splitter 106 polarization separates the incident light by means of transmitting P polarized light and reflecting S polarized light. The S polarized light is discarded as useless light.

The polarizing beam splitter 106, prisms 107A, 107B, 107C, the reflecting type light valves 108B, 108R, 108G, and the projection lens 109 are similar to the polarizing beam splitter 206, prisms 207A, 207B, 207C, the reflecting type light valves 208B, 208R, 208G, and the projection lens 209 of the first embodiment, and a detailed description of their structure and function is omitted.

The aperture stop 109c of the projection lens 109 is arranged in the focal position of the front group lens 109a on the side (front side) of the reflecting type light valve 108. Therefore a telecentric optical system is constituted on the front side of the front group lens 109a by means of the aperture stop 109c and the front group lens 109a. Because of this, the principal rays L3, L4 defined as rays passing through the center of the aperture stop 109c become rays, which are parallel with respect to the optical axis on the side (front side) of the reflecting type light valve 108.

As can be understood from FIG. 3, the lens 104 combines the function of a condenser lens and the function of a field lens. There are two functions of the condenser lens. The first function of a condenser lens is the function of causing condensing of the light beam flux emitted from the secondary light source images formed at the second lens plate 103. The second function of the condenser lens is the function of irradiating causing superposition, on the respective whole surfaces of the reflecting type light valves 108 which are elements to be illuminated, of light beam flux emitted from respective secondary light source images which were formed by means of the fly's eye integrator 102, 103.

The function of the field lens is the function of converting into parallel light beam flux the light beam fluxes (L3, L4, etc.) emitted from the secondary light source images formed at the respective lenses of the plural lenses 103a of the second lens plate 103. Incidentally, the center lens among the plural lenses 103a of the second lens plate 103 is arranged in a conjugate position to the center portion of the aperture stop 109c in the projection lens 109. This conjugate relationship is realized by means of the lens 104 and the front group lens 109a.

Accordingly, the abovementioned light rays L3, L4 coincide with principal rays defined by means of the aperture stop 109c. Therefore the lens 104 can be said to have the function of ensuring that the principal rays L3, L4 are parallel to the optical axis in the light path extending from the lens 104 to the front group lens 109a. As shown in FIG. 3, the principal rays L3, L4 are parallel to the optical axis in the light path extending from the projection lens 109 to the lens 104.

Furthermore, considering in reverse the light path of the principal rays L3, L4 from the lens 104, the principal rays L3, L4 intersect in the position of the lens 103a on the optical axis located in the approximate central portion of the second lens plate 103 constituting the fly's eye integrator. Furthermore, considering in reverse the light path of the principal rays L3, L4 from the second lens plate 103, the principal rays L3, L4, intersecting and diverging intersect with the edge portion of the lenses 102a of the corresponding first lens plate 102. Furthermore when in reverse, the principal rays L3, L4 as parallel light, collide with the light source 101.

Furthermore, similar to the first mode of embodiment, also with regard to rays defined as rays, which pass through the edge portion of the aperture stop 109c of the projection lens 109, they consist of rays, which intersect at the center portion of the lenses 103a of both edge portions of the second lens plate 103.

FIG. 4 shows the principal rays L3, L4 and the light ray (shown in the drawing as broken lines M3, M4) having a numerical aperture (NA). Firstly, we consider the distance of the principal point of the lens 104 and the principal point of the second lens plate 103. The principal rays L3, L4 are parallel to the optical axis from the reflecting type light valve up to the lens 104 via the combined prism and the polarizing beam splitter 106, and are condensed and intersect in the lens 103a on the optical axis of the second lens plate 103. Namely, the principal point of the second lens plate 103 is located in the position of one focal point of the lens 104. Then, the principal point of the lens 104 and the principal point of the second lens plate 103 are separated by a distance of approximately f3.

Next, we consider the distance of the principal point of the lens 104 and the reflecting surface of the reflecting type light valve 108. Incident light rays M3, M4 parallel to the optical axis in the center portion of the lens 103a of both edge portions of the second lens plate 103 travel parallel to the optical axis, are deflected by the power of the lens 104, and are condensed to a point on the optical axis of the reflecting type light valves 108B, 108R, 108G. Namely, the reflecting surface of each reflecting type light valve 108 is located in the focal position of the other side of the lens 104. Then the distance of the principal point of the lens 104 and the reflecting surface of the reflecting type light valve 108 is approximately f3.

The device of the present mode of embodiment has a large degree of design freedom in comparison with the device of the first embodiment. Because of this, the device of the present mode of embodiment has the possibility of designing a shortened distance from the light source 101 to the reflecting type light valve 108. This freedom is described below.

In the case of the device of the first embodiment, the condenser lens 204 is arranged in the neighborhood of the second lens plate 203. The reason for this is that because the illuminating light beam flux from the light source 201 diverges with increasing distance of the condenser lens 204 and the second lens plate 203, the diameter of the condenser lens 204 has to be large. Because of this, the condenser lens 204 comes to be arranged in the neighborhood of the second lens plate 203. Consequently, as described in the first embodiment, the distance from the principal point of the second lens plate 203 and the principal point of the field lens 205 becomes f1. Moreover the distance of the principal point of the field lens 205 and the reflecting surface of the reflecting type light valve 208 becomes approximately f1(f2−f1)/f2.

Accordingly, the distance from the principal point of the second lens plate 203 to the reflecting type light valve 208 becomes as given by the following Equation 1:

$$f1+f1(f2-f1)/f2=2f1-f1^2/f2 \qquad (1)$$

On the other hand, in the device of the present embodiment, the distance of the principal point of the lens 104 and the principal point of the second lens plate 103 is also f3. Moreover, the distance of the principal point of the lens 104 and the reflecting surface of the reflecting type light valve 108 is also f3.

Accordingly, the distance from the principal point of the second lens plate 103 to the reflecting surface of the reflecting type light valve 108 becomes as given by the following Equation 2:

$2f3$ (2)

Because of this, in the present embodiment, the closer the principal point of the lens 104 to the reflecting surface of the reflecting type light valve 108, the shorter the: distance of the principal point of the second lens plate 103 and the reflecting surface of the reflecting type light valve 108, and the smaller the device becomes.

Under the above-mentioned conditions, if the following Equation 3 is satisfied, the device of the present mode of embodiment has a shorter distance of the second lens plate and the reflecting type light valve, and becomes a smaller device than the device of the first embodiment:

$$2f1 - f1^2/f2 > 2f3 \qquad (3)$$

Assuming that the projection lenses of the device of the present mode of embodiment and of the first mode of embodiment have the same numerical aperture, the dimensions of the device of the second mode of embodiment and of the device of the first mode of embodiment are compared under uniform conditions. Generally, from the standpoint of efficiency of illumination, the numerical aperture of the projection lens and the numerical aperture of the illuminating optical system are considered to be the same, and under the abovementioned assumption, the numerical apertures NA of FIG. 2 and FIG. 4 are considered to be the same.

With the game numerical aperture NA, the light path length of the principal point of the lens 104 and the reflecting surface of the reflecting type light valve 108 of the present mode of embodiment can be considered to be the same as the light path length between the principal point of the field lens 205 and the reflecting surface of the reflecting type light valve 208 of the first mode of embodiment.

In this case, the following Equation 4 is satisfied:

$$f3 = f1(f2-f1)/f2 \qquad (4)$$

From Equations 1, 2 and 4, the difference is found of the distance from the second lens plate 203 to the reflecting type light valve 208 of the first mode of embodiment and the distance from the second lens plate 103 to the reflecting type light valve 108 of the present mode of embodiment, as in the following Equation 6:
(Equation 1–Equation 2)

$$= 2f1 - f1^2/f2 - 2f3$$

$$= 2f1 - f1^2/f2 - 2f1(f2-f1)/f2$$

$$= f1^2/f2 > \qquad (5)$$

Accordingly, in the case that the numerical aperture of the projection lens is the same, it is understood from Equation 5 that it is possible to make a small sized device with a shorter distance of the principal point of the second lens plate and the reflecting surface of the reflecting type light valve than in the device of the first embodiment.

In the present embodiment, in the fly's eye integrator 102, 103 which was used, a separated type of fly's eye integrator 102, 103 was used, with the first lens plate 102 and the second lens plate 103 separated. Instead of this, there can also be used an integral type of fly's eye integrator with the function of the first lens plate 102 and second lens plate 103 combined into one. When this is so, the principal point on the emitting surface side of the integral type fly's eye integrator may be arranged in the position of the approximate focal length of the lens 104. In other words, whether the fly's eye integrator is a separated type or an integral type, the principal point of the emitting surface side (second lens plate 103) of the fly's eye integrator may be arranged in the position of tire approximate focal length of the lens 104 which combines the function of the field lens.

Figure 5:
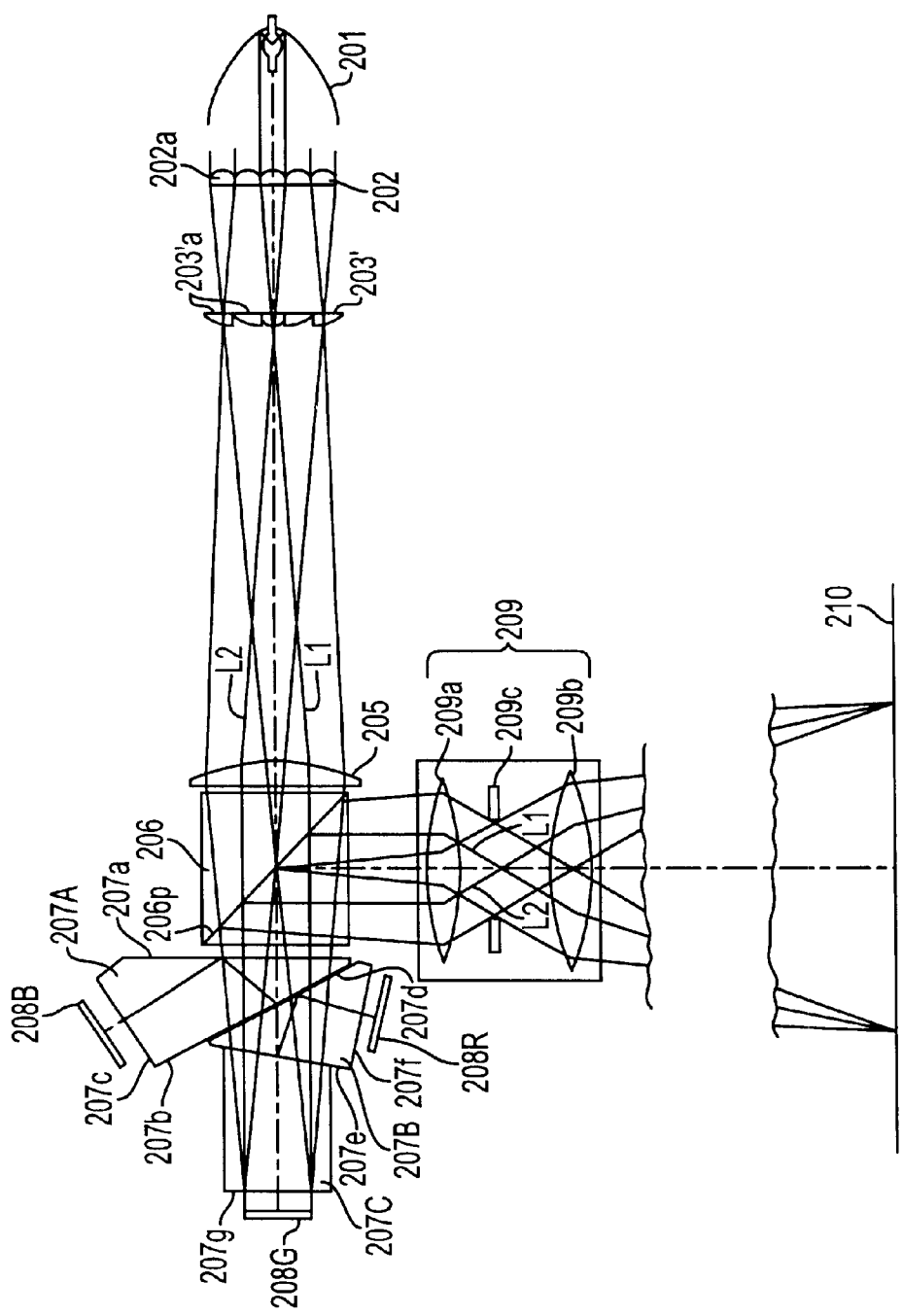
FIG. 5 is a constitution and light ray diagram of the projection type display device of the third embodiment.
Figure 6:
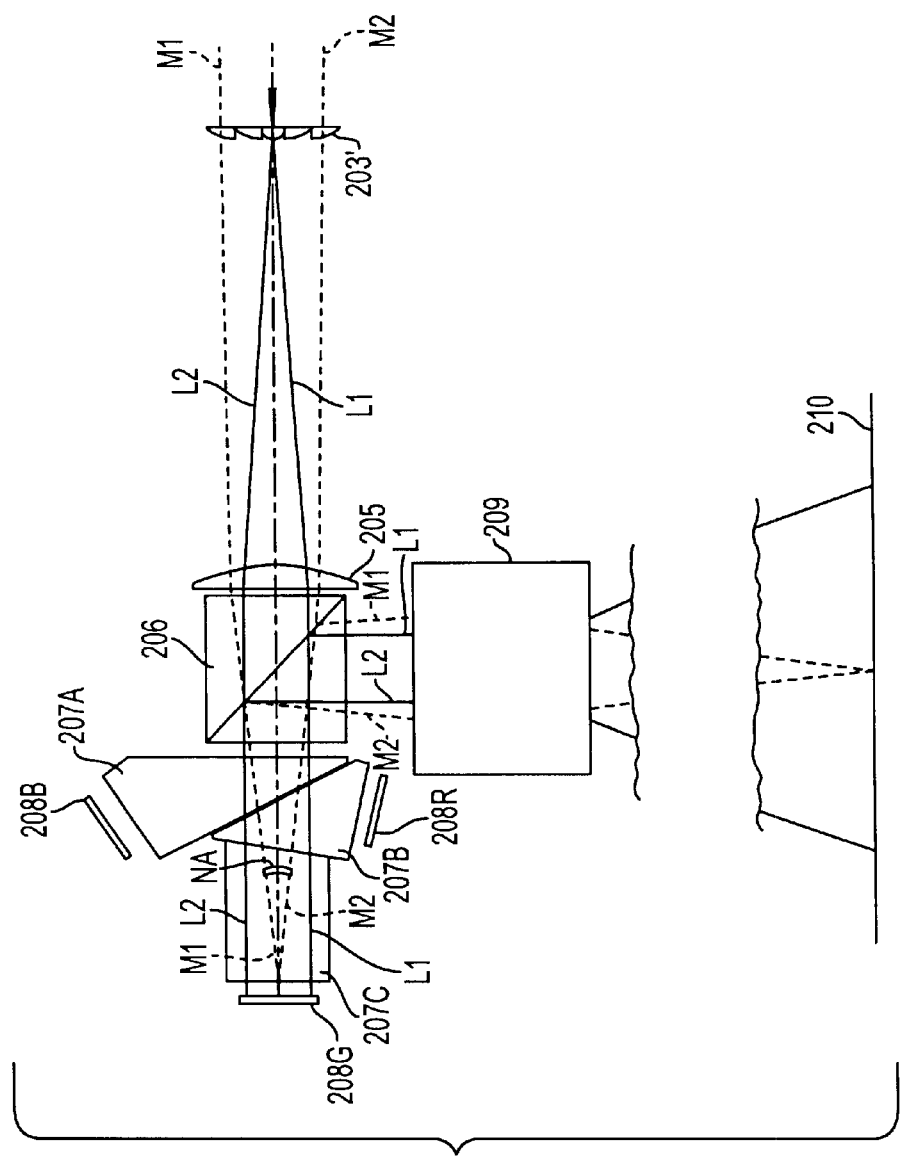
FIG. 6 is a light ray diagram illustrating the principal rays and numerical aperture in the projection type display device of the third embodiment.

FIGS. 5 and 6 show a constitutional diagram and a light path diagram of a projection type display device showing a third embodiment. FIG. 6, similarly to FIG. 2, shows two (L1, L2) among the principal rays defined as the light rays passing through the center of the aperture stop of the projection lens 209, and light rays (M1, M2) which define the numerical aperture (NA) from the optical axis of the reflecting type light valve 208.

The fly's eye integrator and the condenser lens of the present mode of embodiment differ from the first mode of embodiment. Other than these, the constitutional members which are similar to those of the first mode of embodiment are given the same reference numbers, and a detailed description of their constitution rind function is omitted.

The first mode of embodiment had a condenser lens 204 arranged in the neighborhood of the exit surface of the fly's eye integrator. In contrast to this, no condenser lens is arranged in the present embodiment. Instead of this, the second lens plate 203' is constituted having both the function of the second lens plate 203 and the function of the condenser lens 204 of the first embodiment. Namely, the plural lenses 203a' constituting the lens plate 203' are completely different in form, and the whole lens 203' functions as a lens having a focal length f2 (with lower 1/f2). Then via a field lens 205, superposed imaging is caused in a point on the reflecting type light valve 208 conjugate to a point on each lens 202a of the first lens plate 202. Because of this, no separate condenser lens is arranged, and superposed illumination to the respective reflecting type light valves 208 is ensured by the fly's eye integrator only.

The aperture stop 209c is arranged in the position of the focal length of the front group lens 209a. A telecentric optical system in constituted by the so-called front side (reflecting type light valve 208 side). Here, a principal ray is defined as a light ray passing through the center of the aperture stop 209c. The principal rays according to this definition are infinite in number, but among these, two (L1, L2) are illustrated by full lines in FIG. 5.

As in the Figure, the light rays (principal rays) L1, L2 passing through the center of the aperture stop 209c of the projection lens 209 can be considered in reverse with respect to the travel direction (screen direction). Because a telecentric optical system is constituted, as aforementioned, by the front group lens 209a and the aperture stop 209c, the principal rays L1, L2 retain parallelism with respect to the optical axis in the light path between the front group lens 209a and the field lens 205.

Furthermore, considering in reverse the light path of the principal rays L1, L2 from the field lens 205, the principal rays L1, L2 intersect in the position of the lenses 203'a on the optical axis arranged in the approximate central portion of the second lens plate 203' which constitutes the fly's eye integrator.

Furthermore, considering in reverse the light path of the principal rays L1, L2 from the second lens plate 203', the principal rays L1, L2, intersecting and diverging, intersect in the edge portion of the lens 202a of the corresponding first lens plate 202. Traveling further in reverse, the principal rays L1, L2, as parallel light, reach the lamp of the light source 201.

From the above description, it will be understood that a telecentric relationship is maintained in the light path from the exit surface of the field lens 205 to the incidence surface of the front group lens 209a. Furthermore, in FIG. 5, other than the principal rays L1, L2, there are also shown light rays passing through both edges of the aperture stop 209c. As regards these light rays, as can be understood from FIG. 5, they coincide with light rays traveling and intersecting at the center of lenses 203'a of both edges of the second leafs plate 203'. Furthermore, considering similarly to the case of the first embodiment, the distance of the principal point of the field lens 205 and the principal point of the second lens plate 203', is distant by the focal length f1 of the field lens 205. Moreover the distance of the principal point of the field lens 205 and the reflecting surface of the reflecting type light valve 208 is an air equivalent length of (f1(f2−f1))/f2.

Moreover, in the above-mentioned first through third modes of embodiment, a constitution was adopted in which, color separating P polarized light from among the polarized light polarization separated by means of a polarization light beam splitter, it is incident on the reflecting type light valve. Instead of this, a constitution can also be adopted which uses S polarized light and discards P polarized light.

Moreover, in the first through third modes of embodiment, prism members were used as a color separating and synthesizing optical system, but a constitution of a color separating and synthesizing optical system using dichroic mirrors can also be adopted. Because a dichroic film in a dichroic mirror similarly changes in properties according to the angle of incidence, similar effects can also be obtained by means of the constitution of the present embodiment.

Figure 7:
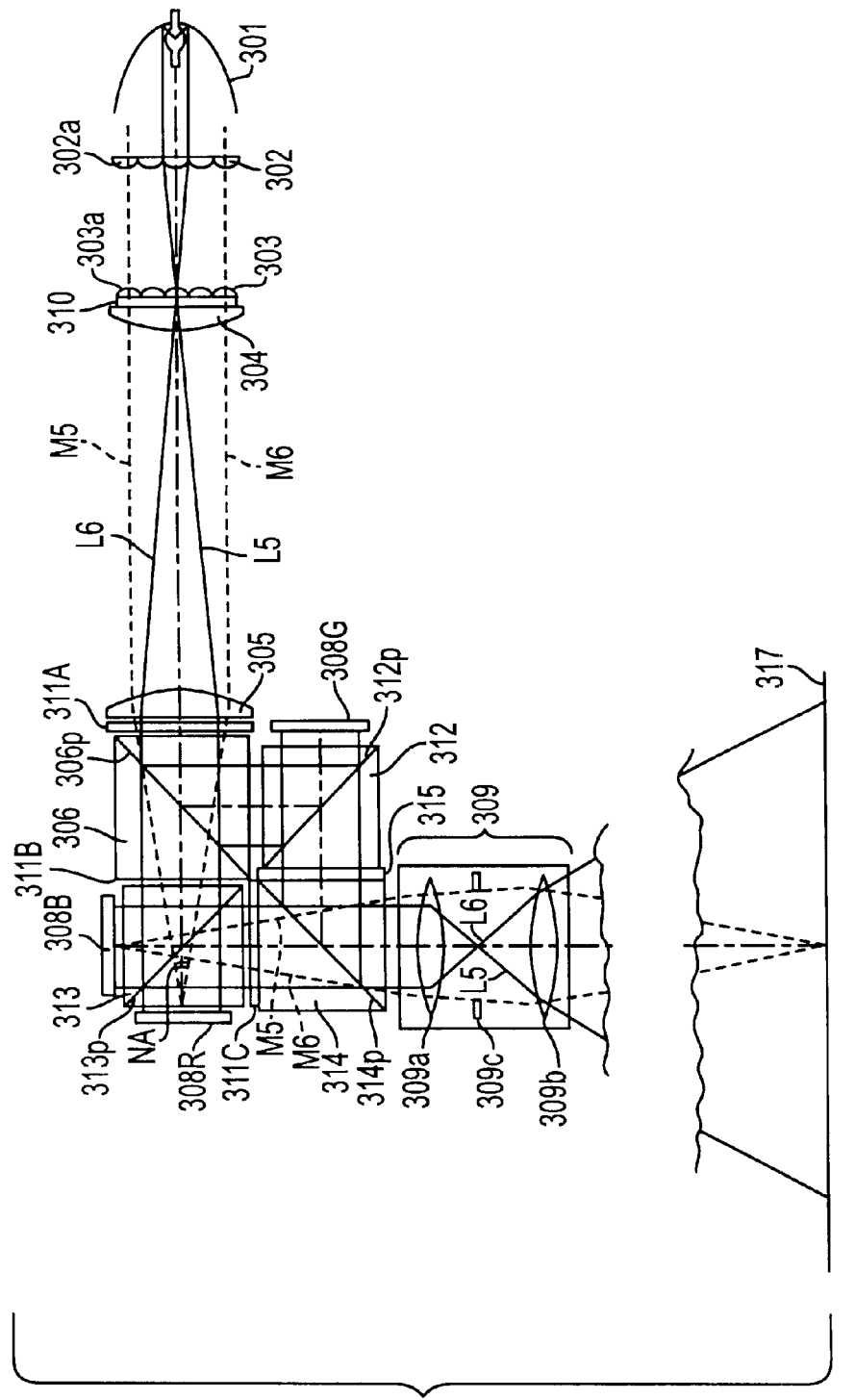
FIG. 7 is a constitution and light ray diagram of the projection type display device of the fourth embodiment.

FIG. 7 shows a basic constitutional diagram of a projection type display device of a fourth mode of embodiment of the present invention and a light ray diagram in said device. Firstly, a description is given of the basic constitution of the projection type display device.

To begin with, the illumination optical system is described. In the present embodiment, as the integrator of the illumination optical system, a so-called fly's eye integrator is adopted. The illumination optical system is constituted from a fly's eye integrator 302, 303, a polarization converting device 310, a condenser lens 304, and a field lens 305. The light source 301 is constituted from a lamp and a concave mirror. The concave mirror is a parabolic mirror. A parabolic mirror was used in order to make the emitted light into an approximately parallel light beam flux. The approximately parallel light beam flux emitted from the light source 301 is incident on the fly's eye integrator 302, 303.

The fly's eye integrator 302, 303 is constituted from a first lens plate 302 and a second leis plate 303. The first lens plate 302 has plural lenses 302a arrayed in a planar manner. The second lens plate 303 has plural lenses 303a arranged in a planar manner. The lenses 303a of the second lens plate are arranged in focal positions of the corresponding lenses 302a of the first lens plate 302.

In the above-mentioned constitution, the approximately parallel light beam flux emitted from the concave mirror is divided by means of the plural lenses 302a of the first lens plate. Then, the light emitted from the plural lenses 302a of the first lens plate is condensed by the corresponding plural lenses 303a of the second leas plate 303. Namely, secondary light source images are respectively formed by the plural lenses 303a of the second lens plate 303.

The polarization converting device 310 is a device which converts light emitted from the second lens plate 303 to singly polarized light, and emits it. The polarization converting device 310 of the present mode of embodiment emits P-polarized light. The constitution of the polarization converting device 310 is briefly described below.

The polarization converting device 310 is constituted by plural small polarizing beam splitters and plural half wave plates. The plural small polarizing beam splitters are adhered so that the respective polarized light separation surfaces become parallel. Then plural half wave plates are arranged on the emitting surface side of alternate plural small polarizing beam splitters. Accordingly, the polarization converting device 310 allows P polarized light to pass through unchanged, and the half wave plates convert S polarized light into P polarized light Accordingly, light emitted from the polarization converting device 310 wholly consists of P polarized light.

The condenser lens 304 is arranged in the neighborhood of the exit surface of the polarization converting device 310. The condenser lens 304 has the function of causing condensation of the illuminating light flux emitted from the secondary light source images formed at the second lens plate 303 via the polarization converting device 310. Moreover, the condenser lens 304 has the function of superposing light beam fluxes emitted from respective secondary light sources formed by means of the fly's eye integrator 302, 303 and illuminating the respective whole surfaces of the reflecting type light valves 308 which are the elements to be illuminated.

The conjugate relationship of the first lens plate 302 and the reflecting type light valves 308R, 308G, 308B is realized by means of the lenses 303a of the second lens plate 303, the condenser lens 304, and the field lens 305. Consequently, the light incident on the plural lenses 303a of the second lens plate 303 is superposed on, and illuminates, the reflecting type light valves 308. Accordingly, the reflecting type light valves 308R, 308G, 308B are uniformly illuminated.

As shown in FIG. 7, the field lens 305 converts to parallel light the light beam fluxes (L5, L6, etc.) emitted from the respective secondary light source images formed by the plural lenses 303a of the second lens plate 303. The center tens among the plural lenses 303a of the second lens plate 303 is arranged in a position conjugate to the center portion of the aperture stop 309c within the projection lens 309. This conjugate relationship is realized by means of the condenser lens 304, the field lens 305, and the front group lens 309a, mainly by means of the field lens 305 and the front group lens 309. As shown in FIG. 7, the field lens 305 converts light beam fluxes, (L5, L6, etc.) emitted from the respective luminous points formed by the various lenses of the plural lenses of the second lens plate 303, into parallel light beam fluxes, and emits them toward the polarizing beam splitter 306.

A description is next given of the color separating optical system. In the single polarized light emitted from the field lens 305, only the G light is converted to S polarized light by means of the wavelength selective phase plate 311A. The wavelength selective phase plate 311A does not change either of the polarization direction of R light or the polarization direction of B light. A wavelength selective phase plate 311 is an element known, for example, from the disclosure in U.S. Pat. No. 5,751,384.

Light emitted from the wavelength selective phase plate 311A is incident on the polarizing beam splitter 306. The polarized light separating surface 306p of the polarizing beam splitter 306 passes P polarized B light and R light, and emits them to a polarizing beam splitter 311. Then, the polarized light separating surface 306p of the polarizing beam splitter 306 reflects S polarized G light, and emits it to the polarizing beam splitter 312. As will be understood from the above-mentioned, a first color separating optical system is constituted by means of the combination of the wavelength selective phase plate 311A and the polarizing beam splitter 306.

Because the above-mentioned G light is S polarized light, it is reflected by the polarized light separating surface 312p of the polarizing beam splitter 312, and is emitted to the reflecting type light valve 308G. On the other hand, the mixed light of the R light and B light, with only the B light being converted into S polarized light by the wavelength selective phase plate 311B, is emitted to the polarizing beam splitter 313.

The R light is P polarized light after passing through the wavelength selective phase plate 311B. Because of this, the R light, passing through the polarized light separating surface 313p of the polarizing beam splitter 313, is emitted to the reflecting type light valve 308R. On the other hand, because the B light is S polarized light, it is reflected by the polarized light separating surface 313p of the polarizing beam splitter 313, and is emitted to the reflecting type light valve 308B.

As will be understood from the above-mentioned, the second color separating optical system is constituted by the combination of the wavelength selective phase plate 311Band the polarizing beam splitter 313. As the reflecting type light valves 308R, 308G, 308B have the same function as the reflecting type light valves 208R, 208G, 208B of the first embodiment, a description is omitted.

The color synthesizing optical system is next described. Only the S polarized light among the light emitted from the reflecting type light valve 308R is reflected by the polarized light separating surface 313p of the polarizing beam splitter 313. Namely, only the S polarized light is analyzed by the polarizing beam splitter 313. Only the P polarized light among the light emitted from the reflecting type light valve 308B passes through the polarized light separating surface 313p of the polarizing beam splitter 313. Namely, only the P polarized light is analyzed by the polarizing beam splitter 313. Only the analyzed R light and B light are emitted from the polarizing beam splitter 313. As will be understood from the above description, the polarizing beam splitter 313 constitutes a first color synthesizing optical system.

Of the R light and B light emitted from the polarizing beam splitter 313, only the R light is converted into P polarized light by the wavelength selective phase plate 311C. Consequently, both the R light and the B light emitted from the wavelength selective phase plate 311C consist of P polarized light. Because the R light and B light are both P polarized light, they both pass through the polarized light separating surface 314p of the polarizing beam splitter 314, and are emitted to the projection lens 309.

Only the P polarized light among the light emitted from the reflecting type light valve 308G passes through the polarized light separating surface 312p of the polarizing beam splitter 312. Namely, only the P polarized light is analyzed by the polarizing beam splitter 312. The G light, which is P polarized light, emitted from the polarizing beam splitter 312 is converted into S polarized light by means of a half wave plate 315. Because the G, light is S polarized light, it is reflected by the polarized light separating surface 314p of the polarizing beam splitter 314, and is emitted to the projection lens 309. As described above, light which is a composite of R light, G light, and B light is emitted from the polarizing beam splitter 314. Accordingly, it can be understood that a second color synthesizing optical system is constituted by the combination of the wavelength selective phase plate 311C, the polarizing beam splitter 314, and the half wave plate 315.

The projection lens 309 projects light emitted from the polarizing beam splitter 314 to the screen 317. Namely, the projection lens 309 projects images of the reflecting type light valves 308R, 308G, 308B to the screen 317. Because the projection lens 309 is similar to the projection lens 209 of the first embodiment, a description of it is omitted. The aperture stop 309c of the projection lens 309 is arranged in the position of the focal length of the front group lens 309a, constituting a so-called front side (reflecting type light valve side) telecentric optical system. Here, a principal ray is defined as a light ray passing through the center of the aperture stop 309c. The principal rays according to this definition are infinite in number, but two (L5, L6) among these are shown as full lines in FIG. 7.

Because a telecentric optical system is constituted as aforementioned by the front group lens 309a and the aperture stop 309c, it can be understood that the principal rays L5, L6 consist of parallel light rays in the optical system, which is between the front group lens 309a and the field lens 305.

By means of the above-mentioned constitution, in the light path extending from the field lens 305 to the front group lens 309a, the light beam flux emitted from the secondary light source images formed by the plural lenses 303a of the second lens plate 302 becomes a parallel light beam flux. Of course, the principal rays L5, L6 also become a parallel light beam flux in the light path extending from the field lens 305 to the front group lens 309a. Consequently, the angle of incidence of the principal rays becomes constant with respect to the polarized light separating members 306p, 312p, 313p, 314p of the polarizing beam splitters 306, 312, 313, 314, the modulating layer of each reflecting type light valve 308, the wavelength selective phase plates 311A, 311B, 311C, and the half wave plate 315, respectively.

The principal rays, in their luminosity, have the greatest effect in the projected picture. Because of this, the device of the present mode of embodiment could bring property changes to a minimum, regardless of the polarized light separating members 306p, 312p, 313p, 314p, and the modulation layer of the respective reflecting type light valves 208, having different properties according to tile angle of incidence. Because of this, the device of present mode of embodiment, in comparison with the prior art devices, realized a reduction of the deterioration of contrast in the projected image, and of the non-uniformity (color non-uniformity) which arose.

Moreover the wavelength selective phase plates 311A, 311B, 311C, the half wave plate 315, and the polarized light separating members 306p, 312p, 313p, 314p, but to some degree not the modulating layer of the respective reflecting type light valves 308, have properties which differ according to the angle of incidence. Because of this, the device of the present embodiment, regardless of the wavelength selective phase plates 311A, 311B, 311C and the half ware plate 315 having properties which change according to the angle of incidence, can make the change of properties a minimum.

Moreover, by means of the above constitution, in the light path extending from the field lens 305 to the front group lens 309a, the parallel light beam flux (principal rays) emitted from the secondary light source images formed at the center lens of the plural lenses 303a of the second lens plate 303 is parallel with respect to the optical axis. Because of this, the image magnification of the reflecting type light valves 308 does not change due to the front group lens 309a. Namely, even if the mounting position of the reflecting type light valves 308 is displaced to some degree in the optical axis direction, the size of the image projected on the screen 317 does not change. Because of this, even if the respective reflecting type light valves 208 are not precisely mounted in the optical axis direction, no picture element displacement, etc., of the picture arises. Consequently, the effect is that the manufacturing cost is reduced.

Furthermore, taking the focal length of the field lens 305 to be f1 and the focal length of the condenser lens 304 to be f2(f2>f1), because the condenser, lens 304 is arranged in the neighborhood of the second lens plate 303, the distance of the principal point of the field lens 305 and the principal point of the condenser lens 304 is approximately f1. The light rays M5, M6 show the numerical aperture (NA) set by means of the aperture stop 309c. The light rays M5, M6 incident parallel to the optical axis from the light source side on the second lens plate 303, are condensed to a position on the optical axis of the reflecting type light valves 308 by means of the condenser lens 304 and the field lens 305 separated by a distance f1.

The distance of the field lens 305 and the reflecting type light valves 308 so as to give the above-mentioned relationship is easily found from the equations of paraxial ray tracing for two thin lenses to be (air equivalent length) (f1(f2−f1))/f2. Namely, the reflecting surface of the reflecting type light valve 308 comes to be located on this side from the position of the focal length of the field lens 305 by an air equivalent length of f1(f1−f2).

By means of the above arrangement, the light emitted from the secondary light source images formed respectively at the plural lenses 303a of the second lens plate 303 is uniformly superposed and illuminates the reflecting type light valves 308. Furthermore, in the present embodiment, by means of the wavelength selective phase plate 311A and the polarizing beam splitter 306, G light, and a mixture of R and B light, were separated, but the present invention is not limited to this. By replacing the wavelength selective phase plate 311A with one having special properties, it is possible for only R light (or only B light) to be separated. In this case, by also having the wavelength selective phase plate 311B also be one with special properties, G light and B light (or R light) may be separated. Furthermore, as shown in the third embodiment, if the second lens plate 303 as a whole has a power, the condenser lens 304 does not have to be separately provided.

Figure 8:
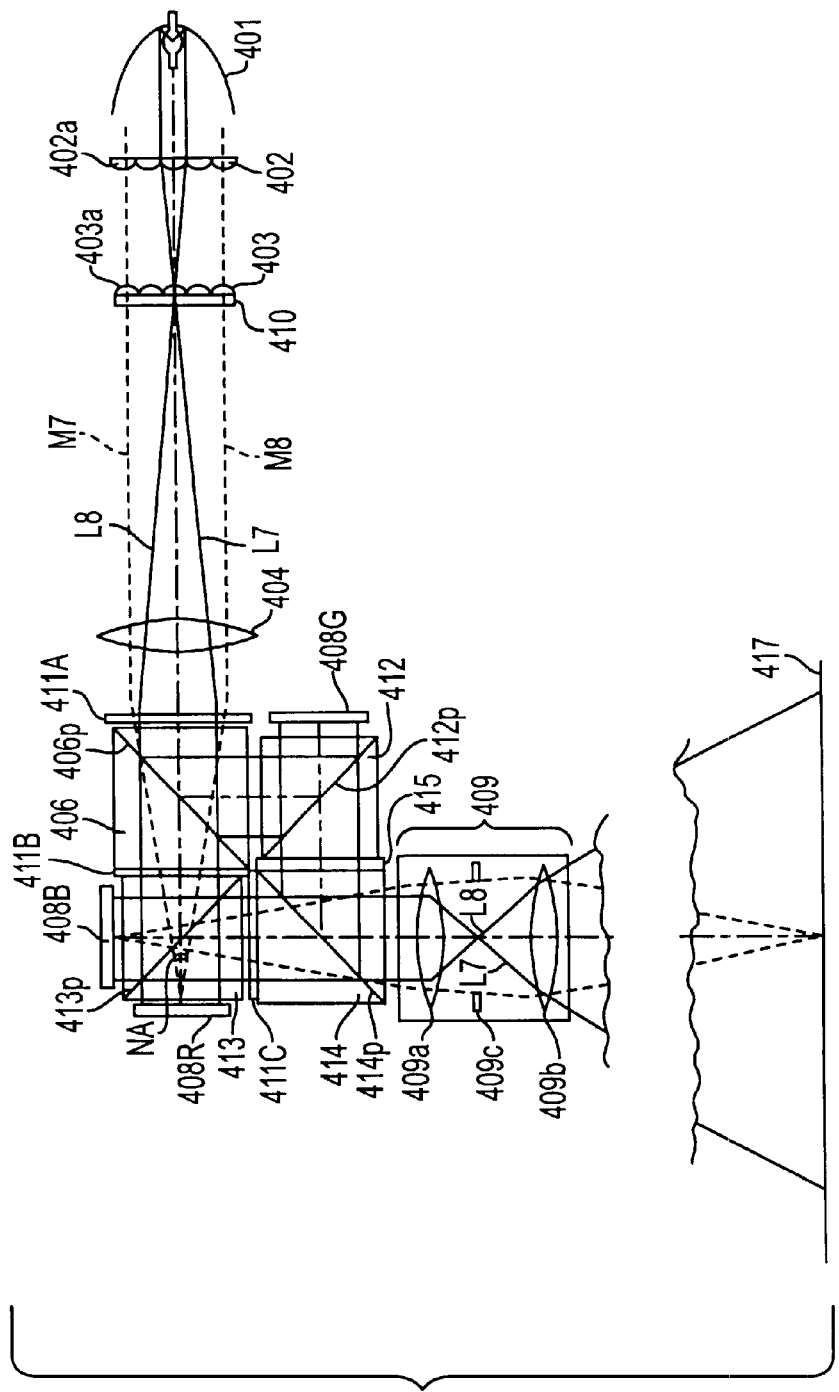
FIG. 8 is a constitution and light ray diagram of the projection type display device of the fifth embodiment.

FIG. 8 shows a basic constitutional diagram of a projection type display device of a fifth mode of embodiment of the present invention and a light ray diagram in this device. The point of difference of the device of the present mode of embodiment from the device of the fourth mode of embodiment is that a lens 404 is loaded which functions conjointly as the condenser lens and the field lens.

The light source 401, first lens plate 402, second lens plate 403, and polarization converting device 410, have the same constitution as the light source 301, first lens plate 302, second lens plate 303, and polarization converting device 310 of the fourth embodiment, and a detailed description of their structure and function is omitted.

In the present mode of embodiment, by combining the respective functions of the condenser lens and the field lens as in the second embodiment, the lens 404 preserves telecentricity. There are two functions of the condenser lens. The first function of a condenser lens is the function of causing condensing of the light beam flux emitted via polarization converting device 410 from the secondary light source images formed art the second lens plate 403. The second function of the condenser lens is the function of irradiating causing the superposition, in the respective whole surfaces of the reflecting type light valves 408, which are elements to be illuminated, of light beam fluxes emitted from respective secondary light source images which were formed by means of the fly's eye integrators 402, 403.

The function of the field lens is the function of converting into a parallel light beam flux the light beam flux (L7, L8, etc.) emitted from the secondary light source images formed at the respective lenses of the plural lenses 403a of the second lens plate 403. Incidentally, the center lens among the plural lenses 403a of the second lens plate 403 is arranged in a conjugate position to the center portion of the aperture stop 409c in the projection lens 409. Accordingly, the light beams L7, L8 coincide with the principal rays defined by the aperture stop 409c. Therefore, the lens 104 may be said to have the function of ensuring that the principal rays become parallel to the optical axis in the light path between the lens 404 and the respective reflecting type light valves 408B, 408R, 408G.

The wavelength selective phase plates 411A, 411B, 411C, the polarizing beam splitters 406, 412, 413, 414, the reflecting type light valves 408R, 408G, 408B, the half wave plate 415, and the projection lens 409, are of the same construction a5 the wavelength selective phase plates 311A, 311B, 311C, the polarizing beam splitters 306, 312, 313, 314, the reflecting type light valves 308B, 3086. 30813, the half wave plate 315, and the projection lens 309 of the fourth mode of embodiment, and a detailed description of their structure and function is omitted.

Figure 9:
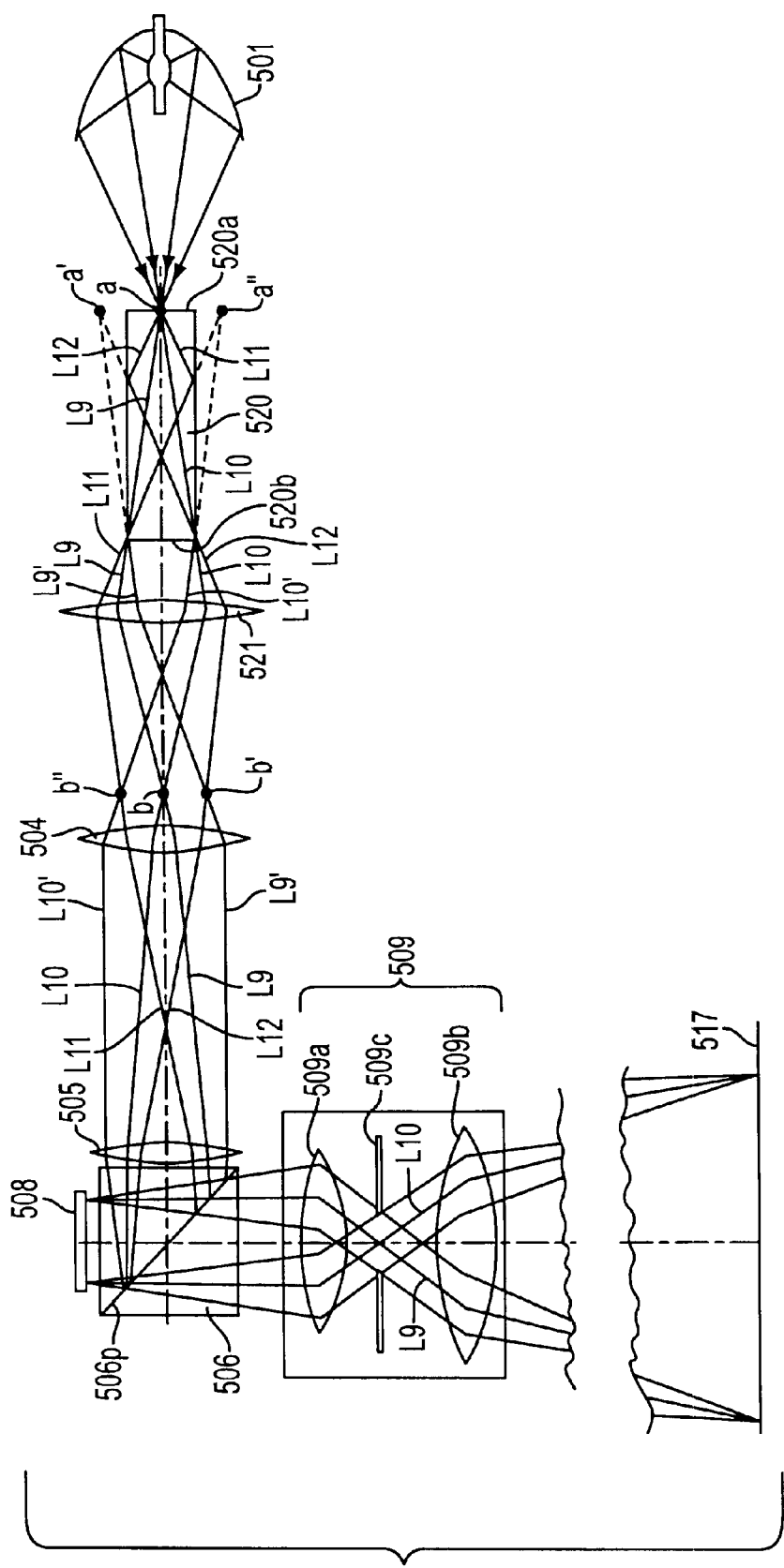
FIG. 9 is a constitution and light ray diagram of the projection type display device of the sixth embodiment.

FIG. 9 shows a basic constitutional diagram of a projection type display device of a sixth mode of embodiment of the present invention and a light ray diagram in this device. In the present mode of embodiment, the color separating optical system and the color synthesizing optical system are omitted, and it is a monochrome projection type display device. The illuminating optical system is described to begin with. In the present mode of embodiment, differing from the modes of embodiment up to now, the so-called rod integrator is adopted as the illuminating optical system. The illuminating optical system is constituted from a light source 501, a rod integrator 520, a relay lens 521, a condenser lens 504, and a field lens 505.

The light source 501 is constituted from a lamp and a concave mirror which is are elliptical mirror. The lamp is arranged in a position of a first focus close to said elliptical mirror of the elliptical mirror. Then, the position of the incidence surface of the rod integrator 520 coincides with the position of the far second focus of the aforementioned elliptical mirror.

As a result, as shown in FIG. 9, the light emitted from the light source 501 is condensed to about the central portion of, and incident on, the incidence surface 520a oaf the rod integrator 520. The incidence surface 520a and exit surface 520b of the rod integrator 520 are formed pit right angles to the optical axis. The cross sectional shape of the incidence surface 520a and exit surface 520b is the proportionally reduced shape of the reflecting type light valve 508 which is the member to be illuminated. Normally the reflecting type light valve 508 has a rectangular shape. Because of this, the perpendicular cross sectional shape of the rod integrator 520 is made a proportionally reduced rectangular shape of the reflecting type light valve 508. Furthermore, the integrator 520 is a transparent optical member, for example, formed as a transparent glass member or a fused quartz glass member.

Light incident on the rod integrator 520, propagating and undergoing repeated internal reflection within the rod integrator, reaches the exit surface 520b, and is emitted from the exit surface 520b. Here, the exit surface 520b constitutes a uniform surface light source. In other words, light from plural virtual images a, a', a" formed in the position of the incidence surface 520a by means of the internal reflections of the rod integrator is-emitted in a superposed manner from the exit surface 520b.

By means of condensing light from the light source 501, a point light source image a is formed as a virtual image of the light source in the approximate center of the incidence surface 520a of the rod integrator 520. Light rays traveling in the direction of the edge portions of the exit surface 520b among light rays emitted from the light source image a are shown as L9, L10. Moreover, two light rays traveling in the direction of the edge portions of the exit surface 520b after total reflection once at the internal surface of the rod integrator 520, among light rays emitted from the virtual image a of the light source, are shown as L11, L12.

There is also the case of the longer length in the optical axis direction of the rod integrator, and the case of reflection more than once by means of the internal surface, but in the present mode of embodiment the rod integrator 520 is taken to be formed with a length giving rise to only one total reflection. As shown in FIG. 9, it can be considered that there are plural virtual images a, a', a" of the light source on the extension of the incidence surface 520a. L9, L10 can be considered as light rays emitted from the virtual image a. L9'; L12 can be considered as light rays emitted from the virtual image a. L9' shows a light ray formed by the reflection of L9 at the edge portion of the rod integrator 520. L10', L11 can be considered as light rays emitted from the virtual image a". L10' shows a light ray formed by the reflection of L10 at the edge portion of the rod integrator 520.

As is clear from FIG. 9, light from plural virtual images a, a', a" is emitted in a superposed manner from the exit surface 520b. Because of this, it can be said that a uniform surface light source is formed by the exit surface 520b. Furthermore, the longer the length of the rod integrator 520 in the optical axis direction, the more the number of total reflections increases, so that the virtual images of the light source become more numerous.

The relay lens 521 forms secondary light source images b, b', b" based on the light emitted from the exit surface 520b of the rod integrator 520. The virtual image a is imaged as the secondary light source image b. The virtual image a' is imaged as the secondary light source image b'. The virtual image a" is imaged as the secondary light source image b".

The secondary light source images b, b', b" of the present mode of embodiment correspond to the secondary light source images respectively formed of plural lenses 203a of the second lens plate 203 of the first mode of embodiment shown in FIG. 1. The position of the secondary light source image b is a position conjugate to the center portion of the aperture stop 509c. This conjugate relationship is realized by means of the condenser lens 504, field lens 505, and front group lens 509a, and is mainly realized by means of the field lens 505 and the front group lens 509a. Consequently, the light rays L9, L10 emitted from the secondary light source image b are principal rays.

The condenser lens 504 is arranged in the neighborhood of the secondary light source images b, b', b". The condenser lens 504 causes superposed imaging of the light emitted from the secondary light source images b, b', b" in the whole surface of the reflecting type light valve 508. Because the function of the condenser lens 504 is the same as the function of the condenser lens 204 of the first embodiment, a detailed description of it is omitted here.

The field lens 505 converts into a respective parallel light beam flux the light beam flux (L9, L10) emitted from the secondary light source images b, the light beam flux (L9', L12) emitted from the secondary light source images b', and the light beam fluxes (L10', L11) emitted from the secondary light source images b". Light emitted from the field lens 505 is polarization separated into P polarized light and S polarized light by the polarized light separating member 506p of the polarizing beam splitter 506. S polarized light is reflected by the polarized light separating member 506p and is emitted to the reflecting type light valve 508. Light emitted from the reflecting type light valve 508 is analyzed by means of the polarized light separating member 506p, and is emitted to the projection lens 509.

Furthermore, because the reflecting type light valve 508, projection lens 509 (front group lens 509a, rear group lens 509b, aperture stop 509c), and the screen 517, have the same function and constitution as the reflecting type light valve 208, projection lens 209 (front group lens 209a, rear group lens 209b, aperture stop 209c), and the screen 210 of the first embodiment, a description is omitted.

By means of the above constitution, light beam flux emitted from the secondary light source images b, b', b" becomes a parallel light beam flux in the light path extending from the field lens 505 to the front group lens 509a. Of course, the principal rays L9, L10 also become a parallel light beam flux in the light path extending from the field lens 505 to the front group lens 509a. Consequently, tile angles of incidence of the principal light rays are constant with respect to the polarized light separating member 506p of the polarizing beam splitter 506, and light modulation layer of the reflecting type light valve 508, arranged in said light path.

The principal rays, in their luminosity, have the greatest effect in the projected picture. Because of this, the device of the present mode of embodiment could hrin2 property changes to a minimum, regardless of the polarized light separating member, 506p, and the modulation layer of the reflecting type light valve 508, having different properties according to the angle of incidence. Because of this, the device of present mode of embodiment, in comparison with the prior art devices, realized a reduction of the deterioration of contrast in the projected image, and of the non-uniformity (color non-uniformity) which arose.

Furthermore, when the focal length of the field lens 505 is f1 and the focal length of the condenser lens 504 is f2(f2>f1), the distance of the principal point of the field lens 505 and the reflecting surface of the reflecting type light valve 508 is an air equivalent length of (f1(f2−f1))/f2. Furthermore, the illuminating device of the sixth mode of embodiment (light source 501, rod integrator 520, relay lens 521) may be used instead of the illuminating device of the first mode of embodiment (light source 201, fly's eye integrator 202, 203). In this case, the illuminating device (light source 501, rod integrator 520, relay lens 521) may be arranged so that the plane in which the secondary light source images b, b', b" of the sixth mode of embodiment are formed coincides with the plane in which the secondary light source images of the second lens plate 203 of the first mode of embodiment are formed.

Moreover, the illuminating device of the sixth mode of embodiment (light source 501, rod integrator 520, relay lens 521) may be used instead of the illuminating device of the second mode of embodiment (light source 101, fly's eye integrator 102, 103). In this case, the illuminating device (light source 501, rod integrator 520, relay lens 521) may be arranged so that the plane in which the secondary light source images b, b', b" of the sixth mode of embodiment are formed coincides with the plane in which the secondary light source images in the second lens plate 103 of the second mode of embodiment are formed.

Moreover, the illuminating device of the sixth mode of embodiment (light source 501, rod integrator 520, relay lens 521) may be used instead of the illuminating device of the third mode of embodiment (light source 201, fly's eye integrator 202, 203'). In this case, the illuminating device (light source 501, rod integrator 520, relay lens 521) may be arranged so that the plane in which the secondary light source images b, b', b" of the sixth mode of embodiment are formed coincides with the plane in which the secondary light'source images of the second lens plate 203' of the third mode of embodiment are formed.

Moreover, the illuminating device of the sixth mode of embodiment (light source 501, rod integrator 520, relay lens 521) may be used instead of the illuminating device of the fourth mode of embodiment (light source 301, fly's eye integrator 302, 303). In this case, the illuminating device (light source 501, rod integrator 520, relay lens 521) may be arranged so that the plane in which the secondary light source images b, b', b" of the sixth mode of embodiment are formed coincides with the plane in which the secondary light source images in the second lens plate 303 of the fourth mode of embodiment are formed.

Moreover, the illuminating device of the sixth mode of embodiment (light source 501, rod integrator 520, relay lens 521) may be used instead of the illuminating device of the fifth mode of embodiment (light source 401, fly's eye integrator 402, 403). In this case, the illuminating device (light source 501, rod integrator 520, relay lens 521) may be arranged so that the plane in which the secondary light source images b, b', b" of the sixth mode of embodiment are formed coincides with the plane in which the secondary light source images in the second lens plate 403 of the fifth mode of embodiment are formed.

Figure 10:
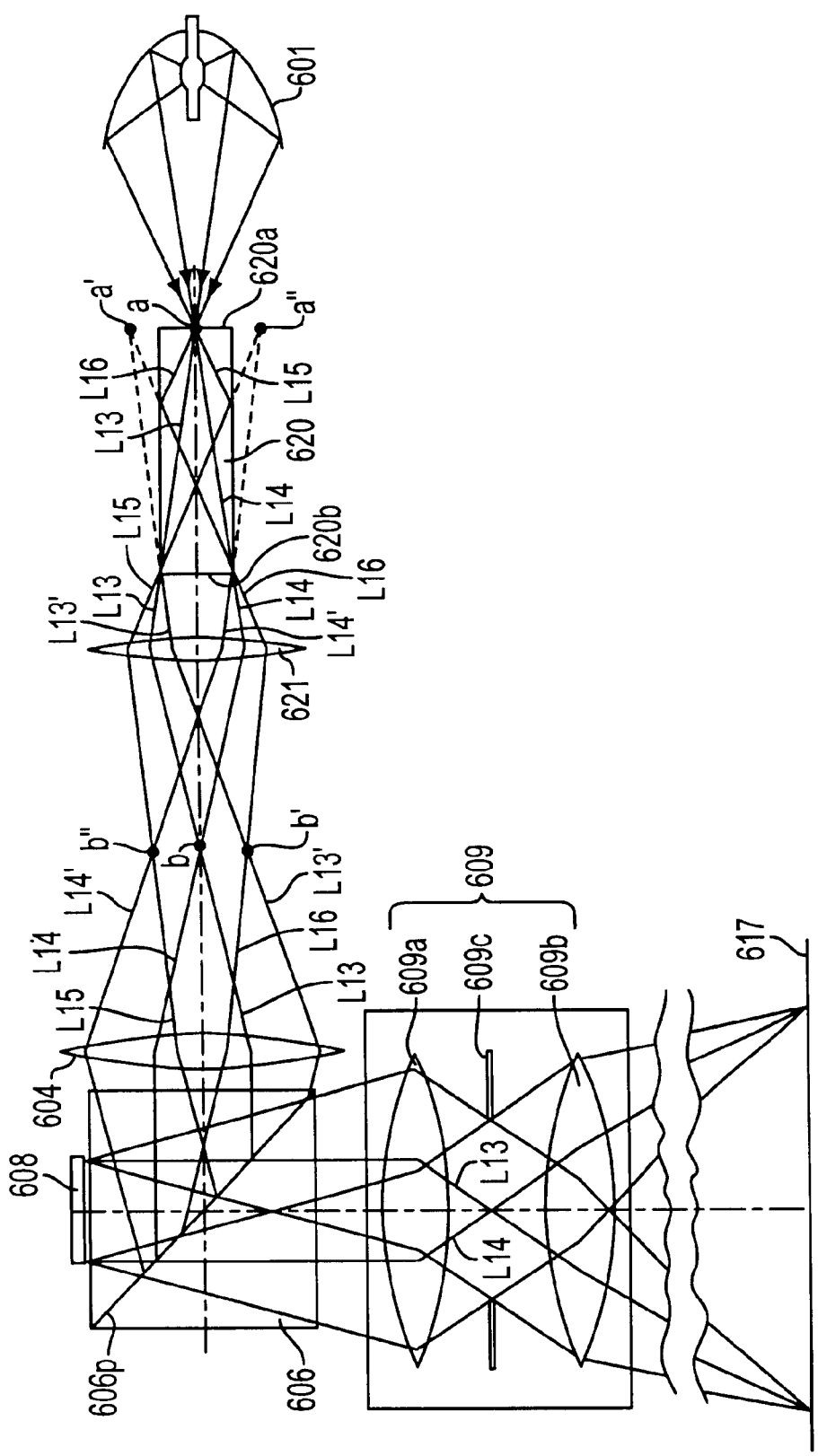
FIG. 10 is a constitution and light ray diagram of the projection type display device of the seventh embodiment.

FIG. 10 shows a basic constitutional diagram of a projection type display device of a seventh mode of embodiment of the present invention and a light ray diagram in this device. In the present mode of embodiment, the color separating optical system and the color synthesizing optical system are omitted, and it is a monochrome projection type display device. The difference between the present mode of embodiment and the sixth mode of embodiment is that the lens 604 of the present mode of embodiment conjointly has the function of the condenser lens and the function of the field lens. Because the constitution is about the same as for the sixth mode of embodiment other than this, the appropriate description is omitted.

In the device of the present embodiment, telecentricity is preserved due to the lens 604 possessing the respective functions of both the condenser lens and the field lens. The light source 601, rod integrator 620, and relay lens 621 have the same function and constitution as the light source 501, rod integrator 520, and relay lens 521 of the sixth embodiment, and a description is therefore omitted.

As can be understood from FIG. 10, the lens 604 has conjointly the function of a condenser lens and the function of a field lens. There are two functions of the condenser lens. The first function of a condenser lens is the function of causing condensing of the light beam flux emitted from the secondary light source images b, b', b". The second function of the condenses lens is the function of irradiating causing the superposition in the reflecting type light valve 608, which is the element to be illuminated, of the light beam flux respectively from secondary light source images b, b', b", or a uniform surface light source light beam flux formed in the exit surface 620b of the rod integrator 620.

The function of the field lens is the function of converting into a parallel light beam flux the respective light beam flux (L13, L14) emitted from the secondary light source image b, the light beam flux (L13', L16) emitted from the secondary light source image b', and the light beam flux (L14', L15) emitted from the secondary light source image b". Incidentally, the secondary light source image b is in a position conjugate to the center portion of the aperture stop 609c in the projection lens 609. This conjugate relationship is realized by means of the lens 604 and the front group lens 609a. Accordingly, the above-mentioned light rays L13, L14 coincide with principal rays defined by means of the aperture stop 609c. Consequently, the lens 604 can be said to have the function of ensuring that the principal rays are parallel to the optical axis in the light path extending from the lens 604 via the reflecting type light valve 608 to the front group lens 609a.

Moreover, the secondary light source images b, b', b" of the present mode of embodiment correspond to the secondary light source images respectively formed of the plural lenses 203a of the second lens plate 203 of the first embodiment. The polarizing beam splitter 606, reflecting type light valve 608, projection lens 609 (front group lens 609a, rear group lens 609b, and aperture stop 609c), and the screen 617 have the same function and constitution as the polarizing beam sputter 506, reflecting type light valve 508, projection lens 509 (front group lens 509a, rear group lens 509b, and aperture stop 509c), and the screen 517 of the fifth embodiment, and a description is omitted.

Furthermore, cases have been described in the first through seventh modes of embodiment in which light emitted from the center of the field lens is parallel to the optical axis, but there is no limitation to these cases. Respective parallel light beam tuxes emitted from the center of the field lens may be incident at the same angle on the polarized light separating member of a polarizing beam splitter or on a modulation layer of a reflecting type light valve.

Furthermore, in the first through seventh modes of embodiment, the field lens, or the lens having the function of a field lens, converts the light beam flux emitted from the secondary light source images into a parallel light beam flux. The tolerance on this parallel light beam flux may be established in the range of an angle of ±1° in the principal rays.

What is claimed is:

1. A projection type display device, comprising:
   a secondary light source image forming optical system which forms plural secondary light source images on a predetermined surface from light beam flux emitted from a light source;
   a polarized light separating optical system which polarization separates light emitted from said plural secondary light source images into a first polarized light component and a second polarized light component;
   a color separating optical system which separates into plural colors, the first polarized light component emitted from said polarized light separating optical system;
   plural reflecting type light valves respectively arranged for each color light emergent from said color separating optical system, plural reflecting type light valves which modulate, based on image information, said first polarized light component to a second polarized light component;
   a color synthesizing optical system which color synthesizes and emits modulated lights respectively emitted from said plural reflecting type light valves;
   an analyzing optical system which analyzes said second polarized light component from light emitted from said color synthesizing optical system;
   a condenser lens which causes condensing of beam fluxes emitted from said plural secondary light source images, and also causes superposition, on the whole surface of respective plural reflection type light valves, of the light beam fluxes emitted respectively from said plural secondary light source images; and a field lens arranged between said plural secondary light source images and said plural reflecting type light valves, which converts each light flux emitted from said secondary light source image into a parallel light flux, and makes said each light flux advance in a different direction, wherein said polarizing separating optical system, and said analyzing optical system are arranged such that each parallel light beam flux is advancing in a different direction, and said plural reflecting type light valves are arranged such that said parallel light beam fluxes advancing from different directions are superposed.

2. The projection type display device of claim 1, further comprising:

a projection type optical system which projects images of said plural reflection type light valves; and an aperture stop within said projection optical system which sets the numerical aperture of the reflected light emitted from said plural reflecting type light valves, wherein, by means of the lens toward the plural reflecting type light valves within the projection optical system and of said condenser lens and of the field lens, said predetermined surface on which said secondary light source images are formed and said aperture stop are in a conjugate relationship.

3. The projection type display device of claim 1, further comprising:

a projection optical system which projects images of said plural reflecting type light valves; and an aperture stop within said projection optical system which sets the numerical aperture of the reflected light emitted from said plural light valves, wherein principal rays defined by said aperture stop which are in the light beam flux emitted from one of secondary light sources, are parallel with respect to optical axes extending at right angle to the center of said plural reflecting type light valves between said field lens and said projection optical system.

4. The projection type display device of claim 1, wherein said plural reflecting type light valves are arranged in positions of optical path length of air equivalent length about $(f1(f2-f1))/f2$ from said field lens (where f1 is the focal length of a field lens, f2 is the focal length of a condenser lens).

5. The projection type display device of claim 1, wherein the secondary light source image forming optical system includes a fly's eye integrator.

6. The projection type display device of claim 5, wherein said fly's eye integrator comprises:

a first lens plate with plural first lens components in a planar configuration; and a second lens plate, having plural second lens components respectively arranged in focal positions of said plural first lens components and disposed corresponding to the first lens plate, said plural second light source images being formed by said plural second lens components such that, the second lens plate conjointly has the function of the condenser lens.

7. The projection type display device of claim 1, wherein said secondary light source forming optical system includes a rod integrator and a relay lens.

8. The projection type display device of claim 1, wherein the function of the field lens and the function of the condenser lens are combined by one conjointly used optical system.

9. A projection type display device, comprising:

a secondary light source image forming optical system which forms plural secondary light source images on a predetermined surface from light emitted from a light source;

a light valve which modulates light emitted from the said plural secondary light source images, based on image information, and emits plural secondary light source images; and a conjoint use optical system which is arranged between said plural secondary light source images and said light valve combining a function of a condenser lens which causes condensation of the light beam fluxes emitted from said plural secondary light source images and which causes superposition in said light valve's whole surface of light beam fluxes emitted respectively from said plural secondary light source images, and a function of a field lens which converts each light flux emitted from secondary light source image into a parallel light flux and makes said each light flux advance in a different direction.

10. The projection type display device of claim 9, further comprising:

a projection optical system which projects an image of said light valve; and an aperture stop within said projection optical system which sets the numerical aperture of light emergent from the light valve, wherein by the lens on the light valve side within said projection optical system and said conjoint use optical system, said predetermined surface on which said plural secondary light source images are formed and said aperture stop are in a conjugate relationship.

11. The projection type display device of claim 9, further comprising:

a projection optical system which projects an image of said light valve; and an aperture stop within said projection optical system which sets the numerical aperture of light emitted from said light valve, wherein principal rays defined by said aperture stop which are in light beam flux emitted from one of secondary light source images are, parallel with respect to an optical axis extending at a right angle to the center of said light valve between said conjoint use optical system and said projection optical system.

12. The projection type display device of claim 9, wherein the secondary light source image forming optical system includes a fly's eye integrator.

13. The projection type display device of claim 9, wherein the secondary light source image forming optical system includes a rod integrator and a relay lens.

14. The projection type display device, comprising:

a secondary light source image forming optical system which forms plural secondary light source images on a predetermined surface from light emitted from a light source;

a polarized light separating optical system which polarization separates the light emitted from said plural secondary light source images into a first polarized light component and a second polarized component;

a color separating optical system which separates the first polarized color component emitted from said polarized light separating optical system into plural color component, and respectively emits the plural color components;

plural reflecting type light valves respectively arranged for each color component emitted from said color separating optical system;

a color synthesizing optical system, color synthesizing modulated light respectively emitted from said plural reflecting type light valves;

an analyzing optical system which analyzes said second polarized color component from light emitted from said color synthesizing optical system; and a conjoint use optical system which is arranged between said plural secondary light source images and said polarized light separating optical system combining a function of a condenser lens which causes condensation of the light beam fluxes emitted from said plural secondary light source images, and which causes superposition in whole planes of a first through third light valves of light beam fluxes emitted respectively from said plural secondary light source images, and a function of a field lens which converts each light flux emitted from said secondary light source image into a parallel light flux, and makes each light flux advance in a different direction.

15. A projection type display device, comprising:

a secondary light source image forming optical system which forms, on a predetermined surface, plural secondary light source images from light emitted from a light source;

a polarized light separating optical system which polarization separates light emitted from said plural secondary light source images;

a first color separating optical system which, separating light emitted from said polarized light separating optical system into first color light and mixed light of second and third colors, emits said first color light and mixed light of second ant third colors;

a second color separating optical system includes a wavelength dependent polarization converting device which polarization converts only one of said second color light and third color light, and emits said second color light and third color light, and a polarizing beam splitter which polarization separates light emitted from said wavelength dependent polarization converting device;

a first reflecting type light valve which modulates, according to image information, said first color light emitted from said first color separating optical system;

a second reflecting type light valve which modulates, according to image information, said second color light emitted from said second color separating optical system;

a third reflecting type light valve which modulates, according to image information, said third color light emitted from said second color separating optical system;

an analyzing optical system, analyzing and emitting light emitted from said first reflecting type light valve;

a first color synthesizing optical system, analyzing, color synthesizing and emitting light emitted from said second reflecting type light valve and said third reflecting type light valve;

a second color synthesizing optical system, color synthesizing and emitting light emitted from said first color synthesizing optical system and said analyzing optical system such that said second color separation optical system includes a wavelength dependent polarized light converting device which, polarization converting only one of said second color light and third color light, emits the second color light and the third color light, and a polarizing beam splitter which polarization separates light emitted from said wavelength dependent polarized light converting device, said first color synthesis optical system includes said polarizing beam splitter conjointly used with said second color separating optical system furthermore having a condensing lens causing condensing of light beam flux emitted from the plural secondary light source images, and also causing the superposition, in the respective whole plane of the first through third light valves, of light beam flux emitted respectively from said plural secondary light source images; and a field lens arranged between the plural secondary light source images and the first through third reflecting type light valves, which converts each light flux emitted from said secondary light source image into a parallel light beam flux, and makes said each light flux advance in a different direction, such that said analyzing optical system, and the first color synthesizing optical system and the second color synthesizing optical system are arranged such that each parallel light beam flux that is advanced is advanced in a different direction, and said first through third reflecting type light valves are arranged such that said parallel light beam fluxes advancing in different directions are superposed.

16. The projection type optical system of claim 15, further comprising:

a projection optical system that projects images of said first through third reflecting type light valves; and an aperture stop within said projection optical system which sets the numerical aperture of the reflected light emitted from said first through third reflecting type light valves such that by the lens toward the first through third reflecting type light valves among said projection optical system and the condenser lens and the field lens, said predetermined surface on which said secondary light source images are formed and the aperture stop are in a conjugate relationship.

17. The projection type display device of claim 15, further comprising:

a projection optical system which projects images of the first through third reflecting type light valves; and an aperture stop within said projection optical system which sets the numerical aperture of reflected light emitted from the first through third reflecting type light valves, such that principal rays defined by said aperture stop which are in the light beam flux emitted from one of secondary light sources are parallel with respect to the optical axes extending at right angles to the center of the first through third reflecting type light valves between said field lens and said projection optical system.

18. The projection type display device of claim 15, wherein the first through third reflecting type light valves are arranged in a position of optical path length of air equivalent length about $(f1(f2-f1))/f2$ from the field lens (where $f1$ is the focal length of a field lens, $f2$ is the focal length of a condenser lens).

19. The projection type display device of claim 15, wherein said secondary light source image forming optical system includes a fly's eye integrator.

20. The projection type display device of claim 15, wherein said secondary light source image forming optical system includes a rod integrator and a relay lens.

21. The projection type display device of claim 15, wherein the function of the field lens and the function of the condenser lens are combined of one conjointly used optical system.

22. A projection type display device, comprising:
a secondary light source image forming optical system which forms on a predetermined surface, plural secondary light source images from light emitted from a light source;
a polarized light separating optical system which polarization separates light emitted from said plural secondary light source images;
a first color separating optical system which separates light emitted from said polarized light separating optical system into first color light and mixed light of second and third colors, and emits said first color light and mixed light of second and third colors;
a second color separating optical system which separates, from said mixed light of second and third colors, second color light and third color light, and emits said second color light and third color light;
a first reflecting type light valve which modulates, according to image information, said first color light emitted from said first color separating optical system;
a second reflecting type light valve which modulates, according to image information, said second color light emitted from said second color separating optical system;
a third reflecting type light valve which modulates, according to image information, said third color light emitted from said second color separating optical system;
a field lens arranged between the plural secondary light source images and the first through third reflecting light valves, which converts each light flux emitted from said secondary light source image into a parallel light beam flux, and makes said each light flux advance in a different direction;
an analyzing optical system, analyzing and emitting light emitted from said first reflecting type light valve;
a first color synthesizing optical system, analyzing, color synthesizing and emitting light emitted from said second reflecting type light valve and said third reflecting type light valve;
a second color synthesizing optical system, color synthesizing and emitting light emitted from said first color synthesizing optical system and said analyzing optical system wherein said second color separating optical system comprises
a wavelength dependent polarized light converting device which converts only one of said second color light and third color light arranged at where said each parallel light beam flux is advancing in a different direction and
a polarizing beam splitter, polarization separating light emitted from said wavelength dependent polarized light converting device; and
said first color synthesizing optical system comprises
said polarizing beam splitter conjointly used with said second color separating optical system
a condensing lens causing condensing of the light beam flux emitted from the plural secondary light source images, and also causing superposition, in the respective whole plane of the first through third light valves, of light beam flux emitted from the plural secondary light source images, and
a field lens arranged between the plural secondary light source images and the first through third reflecting type light valves, which convert to parallel light beam flux the light beam flux emitted from the predetermined point of the plural secondary light source images and said wavelength dependent polarized light conversion device is arranged in said parallel light beam flux converted by said field lens.

23. The projection type display device of claim 22, further comprising:
a projection optical system projecting images of the first through third reflecting type light valve; and
an aperture stop within said projection optical system which sets the numerical aperture of the reflected light emitted from said first through third reflecting type light valves, such that by the lens toward the first through third reflecting type light valves among said projection optical system, and of the condenser lens and of the field lens, said predetermined surface on which said secondary light source images are formed and the aperture stop are in a conjugate relationship.

24. The projection type display device of claim 22, further comprising:
a projection optical system which projects images of the first through third reflecting type light valves; and
an aperture stop within said projection optical system which sets the numerical aperture of the reflected light emitted from the first through third reflecting type light valves, such that principal rays defined by said aperture stop which are in the light beam flux emitted from one of said secondary light sources are parallel with respect to the optical axes extending at right angle to the center of the first through third reflecting type light valves between said field lens and said projection optical system.

25. The projection type display device of claim 22, wherein said secondary light source image forming optical system includes a fly's eye integrator.

26. The projection type display device of claim 22, wherein said secondary light source image forming optical system includes a rod integrator and a relay lens.

27. The projection type display device of claim 22, wherein the function of the field lens and the function of the condenser lens are combined by one conjointly used optical system.

28. A projection type display device comprising:
a secondary light source image forming optical system which forms on a predetermined surface, plural secondary light source images from light emitted from a light source;
a polarized light separating optical system which polarization separates light emitted from said plural secondary light source images;
a first color separating optical system which separates light emitted from said polarized light separating optical system into first color light and mixed light of second and third colors, and emits said first color light and mixed light of second and third colors;
a second color separating optical system which separates, from said mixed light of second and third colors, second color light and third color light, and emits said second color light and third color light;
a first reflecting type light valve which modulates, based on image information, said first color light emitted from said first color separating optical system;
a second reflecting type light valve which modulates, based on image information, said second color light emitted from said second color separating optical system;

a third reflecting type light valve which modulates, based on image information, said third color light emitted from said second color separating optical system;

an analyzing optical system, analyzing and emitting light emitted from said first reflecting type light valve;

a first color synthesizing optical system, analyzing, color synthesizing and emitting light emitted from said second reflecting type light valve and said third reflecting type light valve; and a second color synthesizing optical system, color synthesizing and emitting light emitted from said first color synthesizing optical system and said analyzing optical system, wherein said second color separating optical system includes a wavelength dependent polarized light converting device which converts only one of said second color light and third color light, and a polarizing beam splitter, polarization separating light emitted from said wavelength dependent polarized light converting device, said first color synthesizing optical system includes said polarizing beam splitter conjointly used with said second color separating optical system further comprising a conjoint use optical system which is arranged, between said plural secondary light source images and said first through third reflecting type light valves combining a function of condenser lens which causes condensation of the light beam fluxes emitted from said plural secondary light source images, and which causes superposition in the respective whole planes of the first through third light valves of light fluxes emitted respectively from said plural secondary light source images, and a function of field lens which converts each light flux emitted from said secondary light source image into a parallel light flux, and makes said each light flux advance in a different direction.

29. The projection type optical system of claim 28, further comprising:

projection optical system projecting images of the first through third reflecting type light valves; and an aperture stop within said projection optical system which sets the numerical aperture of the reflected light emitted from said light valves, wherein, by the lens toward the plural reflecting light valves among said projection optical system and of said conjoint use optical system, said predetermined surface on which said secondary light sources are formed and the aperture stop are in a conjugate relationship.

30. The projection type display device of claim 28, further comprising:

a projection optical system which projects images of the first through third reflecting type light valves; and an aperture stop within said projection optical system which sets the numerical apertures of the reflected light emitted from the first through third reflecting light valves such that said principal rays defined by said aperture stop which are in the light beam flux emitted from one of the secondary light sources are parallel with respect to the optical axes extending at right angle to the center of the first through third valves between said conjointly used optical system and said projection optical system.

31. The projection type display device of claim 28, wherein said secondary light source image forming optical system includes a fly's eye integrator.

32. The projection type display device of claim 28, wherein said secondary light source image forming optical system includes a rod integrator and a relay lens.

33. A projection type display device, comprising:

a light beam flux converting optical system which makes plural beam fluxes from light emitted from a light source and converts said each beam flux into a parallel beam flux and makes said each beam flux advance in a different direction;

a polarized light separating color separating optical system which polarization separates and color separates light which was emitted from said light beam flux converting optical system;

plural reflecting type light valves which modulate polarized light components emitted from said polarized light separating color separating optical system based on image information; and a color synthesizing and analyzing optical system performing color synthesis and analysis of modulated light which were emitted from said plural reflecting type light valves, such that said polarized light separating color separating optical system, said plural reflecting type light valves, and the analyzing portion of said color synthesizing and analyzing optical system, are arranged at where said each parallel light beam flux is advancing in a different direction in the parallel light beams converted by said parallel light beam flux converting optical system.

34. The projection type display device of claim 33, wherein said light beam flux converting optical system comprises:

a secondary light beam source images forming optical system which forms plural secondary light sources on a predetermined surface from light emitted from a light source; and a field lens arranged between said plural secondary light source images and said plural reflecting type light valves, which converts said plural secondary light source images each light flux from said secondary light source image into a parallel light beam flux and makes said each light flux advance in a different direction.

35. A projection type display device, comprising:

a secondary light source converter that converts a light beam flux emitted from a light source into a plurality of secondary light beam fluxes;

a field lens arranged between the secondary light source converter and a plurality of reflecting type light valves, that converts into parallel light beam fluxes the plurality of secondary light beams and makes each parallel light flux advance in a different direction;

a polarizer that polarizes the parallel light beam fluxes into a first polarized light component;

a condenser lens that condenses the plurality of secondary light beam fluxes emitted from the secondary light source converter, and causes the superposition of the plurality of light beam fluxes emitted from the secondary light source converter;

a color separating optical system that separates the first polarized light component into a plurality of first polarized color components;

a plurality of reflecting type light valves respectively arranged for each of the plurality of first polarized color components emitted from the color separating optical system, that modulate, based on image information, the first polarized color component to a second polarized color component;

a color synthesizing optical system that color synthesizes and emits the second polarized color component as a second polarized light component; and an analyzing optical system that analyzes the second polarized light component.

36. The projection type display device of claim 35, further comprising:

an aperture stop that sets the aperture of the second polarized light component, wherein a projection lens and the field lens are in a conjugate relationship using a predetermined point and a central portion of the aperture stop.

37. The projection type display device of claim 35, further comprising:

an aperture stop which sets the numerical aperture of the reflected light emitted from the plural light valves, wherein principal rays defined by the aperture stop which are in the light beam flux emitted from the secondary light source converter, are parallel with respect to optical axes extending at right angle to the center of the plural reflecting type light valves.

38. The projection type display device of claim 35, wherein the plural reflecting type light valves are arranged in positions of optical path length equivalent to about $(f1(f2-f1))/f2$ from the field lens (where $f1$ is the focal length of a field lens and $f2$ is the focal length of a condenser lens).

39. The projection type display device of claim 35, wherein the secondary light source converter includes a fly's eye integrator.

40. The projection type display device of claim 39, wherein the fly's eye integrator comprises:

a first lens plate with plural first lens components in a planar configuration; and a second lens plate, also functioning as a condenser lens, that has plural second lens components respectively arranged in focal positions of the plural first lens components and disposed corresponding to the first lens plate, the plurality of secondary light beams being formed by the plural second lens components.

41. The projection type display device of claim 35, wherein the secondary light source converter includes a rod integrator and a relay lens.

42. The projection type display device of claim 35, wherein the function of the field lens and the function of the condenser lens are combined.

\* \* \* \* \*